(12) United States Patent
Liao et al.

(10) Patent No.: US 10,482,353 B2
(45) Date of Patent: Nov. 19, 2019

(54) BANDWIDTH SELECTION IN SUPPORT VECTOR DATA DESCRIPTION FOR CLASSIFICATION OR OUTLIER DETECTION

(71) Applicant: SAS Institute Inc., Cary, NC (US)

(72) Inventors: Yuwei Liao, Cary, NC (US); Deovrat Vijay Kakde, Cary, NC (US); Arin Chaudhuri, Raleigh, NC (US); Hansi Jiang, Raleigh, NC (US); Carol Wagih Sadek, Chapel Hill, NC (US); Seung Hyun Kong, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/055,336

(22) Filed: Aug. 6, 2018

(65) Prior Publication Data

US 2019/0042891 A1 Feb. 7, 2019

Related U.S. Application Data

(63) Continuation-in-part of application No. 15/887,037, filed on Feb. 2, 2018.

(Continued)

(51) Int. Cl.
*G06N 7/00* (2006.01)
*G06N 20/00* (2019.01)
(Continued)

(52) U.S. Cl.
CPC .......... *G06K 9/6269* (2013.01); *G06F 17/16* (2013.01); *G06F 17/18* (2013.01); *G06K 9/6215* (2013.01);
(Continued)

(58) Field of Classification Search
CPC ...... G06K 9/6269; G06K 9/66; G06K 9/6215; G06N 20/00; G06N 7/00; G06F 17/16; G06F 17/18
See application file for complete search history.

(56) References Cited

U.S. PATENT DOCUMENTS 8,725,663 B1 * 5/2014 Triantaphyllou ...... G06N 20/00
706/12
9,536,208 B1 1/2017 Kakde et al.
(Continued)

OTHER PUBLICATIONS

Kakde, Deovrat, et al. "Peak criterion for choosing Gaussian kernel bandwidth in support vector data description." 2017 IEEE International Conference on Prognostics and Health Management (ICPHM). IEEE, 2017. (Year: 2017).*
(Continued)

*Primary Examiner* — Eric Nilsson
(74) *Attorney, Agent, or Firm* — Bell & Manning, LLC

(57) ABSTRACT

A computing device determines a bandwidth parameter value for outlier detection or data classification. A mean pairwise distance value is computed between observation vectors. A tolerance value is computed based on a number of observation vectors. A scaling factor value is computed based on a number of observation vectors and the tolerance value. A Gaussian bandwidth parameter value is computed using the mean pairwise distance value and the scaling factor value. An optimal value of an objective function is computed that includes a Gaussian kernel function that uses the computed Gaussian bandwidth parameter value. The objective function defines a support vector data description model using the observation vectors to define a set of support vectors. The Gaussian bandwidth parameter value and the set of support vectors are output for determining if a new observation vector is an outlier or for classifying the new observation vector.

30 Claims, 20 Drawing Sheets

Related U.S. Application Data

(60) Provisional application No. 62/669,366, filed on May 9, 2018, provisional application No. 62/650,263, filed on Mar. 29, 2018, provisional application No. 62/544,879, filed on Aug. 13, 2017, provisional application No. 62/542,006, filed on Aug. 7, 2017.

(51) Int. Cl.
    *G06N 20/10*      (2019.01)
    *G06F 17/16*      (2006.01)
    *G06K 9/62*      (2006.01)
    *G06F 17/18*      (2006.01)
    *G06K 9/66*      (2006.01)

(52) U.S. Cl.
    CPC ............... *G06K 9/66* (2013.01); *G06N 7/00* (2013.01); *G06N 20/00* (2019.01); *G06N 20/10* (2019.01)

(56) References Cited

U.S. PATENT DOCUMENTS

2011/0242306 A1\* 10/2011 Bressler .................. A61B 3/12
                                                                                  348/78
2016/0253598 A1     9/2016   Yamada et al.

OTHER PUBLICATIONS

Csato et al., Sparse Representation for Gaussian Process Models, Neural Computing Research Group, School of Engineering and Applied Sciences, 2001, pp. 1-7.

SAS Visual Data Mining and Machine Learning 8.2, Programming Guide, Copyright SAS Institute Inc., Chapters 14 and 15, 2017, pp. 36 pages.

Stein, David., Material Identification and Classification from Hyperspectral Imagery Using the Normal Compositional Model, Algorithms and Technologies for Multispectral, Hyperspectral, and Ultraspectral Imagery IX, 2003, pp. 559-568.

Chaudhuri et al., The Mean and Median Criterion for Automatic Kernal Bandwidth Selection for Support Vector Data Description, ARxIV:1708.05106V2, Aug. 21, 2017, pp. 1-9.

Munoz-Mari et al., Semisupervised One-Class Support Vector Machines for Classification of Remote Sensing Data, IEEE Transactions on Geoscience and Remote Sensing, vol. 48, No. 8, Aug. 2010, pp. 3188-3197.

Sanchez-Hernandez et al., One-Class Classification for Mapping a Specific Land-Cover Class: SVDD Classification of Fenland, IEEE Transactions on Geoscience and Remote Sensing, vol. 45, No. 4, Apr. 2007, pp. 1061-1073.

Dai et al., Material Intelligent Identification based on Hyperspectral Imaging and SVM, 2015 First International Conference on Computational Intelligence Theory, Systems and Applications, 2015, pp. 69-72.

Khazai et al., Improving the SVDD Approach to Hyperspectral Image Classification, IEEE Geoscience and Remote Sensing Letters, vol. 9, No. 4, Jul. 2012, pp. 594-598.

Bioucas-Dias et al, Hyperspectral Remote Sensing Data Analysis and Future Challenges, IEEE Geoscience and remote sensing magazine, Jun. 2013, pp. 6-36.

Mehl et al., Development of hyperspectral imaging technique for the detection of apple surface defects and contaminations, Journal of Food Engineering, vol. 61, 2004, pp. 67-81.

Munoz-Mari et al., A Support Vector Domain Description Approach to Supervised Classification of Remote Sensing Images, IEEE Transactions on Geoscience and Remote Sensing, vol. 45, No. 8,, Aug. 2007, pp. 2683-2692.

Kruse et al., Comparison of Airborne Hyperspectral Data and EO-1 Hyperion for Mineral Mapping, IEEE Transactions on Geoscience and remote Sensing, vol. 41, No. 6, Jun. 2003, pp. 1388-1400.

Kakde et al., A Non-Parametric Control Chart for High Frequency Multivariate Data, arXiv.org, Jul. 2016, pp. 1-6.

Liao et al., A New Bandwidth Selection Criterion for Using SVDD to Analyze Hyperspectral Data, Proc. SPIE 10644, May 6, 2018, pp. 1-12.

Scheinberg, Katya, An Efficient Implementation of an Active Set Method for SVMs, Journal of Machine Learning Research, 2006, pp. 2237-2257.

Cauwenberghs et al, Incremental and Decremental Support Vector, Advances in Neural Information Processing Systems, 2001, pp. 409-415.

Syed et al., Incremental Learning with Support Vector Machines, 1999, pp. 6 pages.

Gu et al., Incremental Support Vector Learning for Ordinal Regression, IEEE Transactions on Neural Networks, vol. 6, No. 1, Jan. 2007, pp. 1403-1416.

Laskov et al., Incremental Support Vector Learning: Analysis, Implementation and Applications, Journal of Machine Learning Research, vol. 7, 2006, pp. 1909-1936.

Karasuyama et al., Multiple Incremental Decremental Learning of Support Vector Machines, Advances in Neural Information Processing Systems, 2009, pp. 907-915.

Tax et al., Online SVM Learning: From Classification to Data Description and Back, Neural Networks for Signal Processing, 2003, 2003, pp. 499-508.

Ben-Hur et al., Support Vector Clustering, Journal of Machine Learning Research 2, 2001, pp. 125-137.

Scholkopf et al., Support Vector Method for Novelty Detection, In Advances in Neural Information Processing Systems, 2000, pp. 582-588.

Wikipedia—Invertible matrix, https://en.wikipedia.org/wiki/Invertible_marix, May 4, 2018, pp. 11 pages.

Wikipedia—Lu decomposition, https://en.wikipedia.org/wiki/LU-decomposition, May 4, 2018, pp. 11 pages.

Jiang et al., Fast Incremental SVDD Learning Algorithm with the Gaussian Kernal, ariv:1709.00139v3, Available Feb. 2018, pp. 21 pages.

Gallier, Jean, The Schur Complement and Symmetric Positive Semidefinite (and Definite) Matrices), Penn Engineering, Dec. 10, 2010, pp. 1-12.

Smola et al., Learning with Kernels, 1998, pp. 28-34.

Xiao et al., "Two methods of selecting Gaussian kernel parameters for one-class SVM and their application to fault detection," Knowledge-Based Systems 59, 2014, pp. 75-84.

Meyer, Carl D., Matrix analysis and applied linear algebra, Chapter 6.2—Additional Properties of Determinants, 2000, pp. 475-487.

\* cited by examiner

| Data Set | Botswana | KSC | Indian Pines |
|---|---|---|---|
| Sensor Type | Hyperion | AVIRIS | AVIRIS |
| Spatial Resolution | 30 m | 18 m | 20 m |
| Image Size | 1476×256 | 512×614 | 145×145 |
| # of Spectral Bands | 145 | 176 | 200 |
| # of Classes | 14 | 13 | 16 |

| 1100 | Botswana | | KSC | | Indian Pines | |
|---|---|---|---|---|---|---|
| Class # | Class Name | # of Samples | Class Name | # of Samples | Class Name | # of Samples |
| 1 | Water | 270 | Scrub | 761 | Alfalfa | 46 |
| 2 | Hippo Grass | 101 | Willow swamp | 243 | Corn-notill | 1428 |
| 3 | Floodplain grasses 1 | 251 | Cabbage palm hammock | 256 | Corn-mintill | 830 |
| 4 | Floodplain grasses 2 | 215 | Cabbage palm / oak hammock | 252 | Corn | 237 |
| 5 | Reeds | 269 | Slash pine | 161 | Grass-pasture | 483 |
| 6 | Riparian | 269 | Oak/broadleaf hammock | 229 | Grass-trees | 730 |
| 7 | Firescar | 259 | Hardwood swamp | 105 | Grass-pasture-mowed | 28 |
| 8 | Island interior | 203 | Spartina marsh | 431 | Hay-windrowed | 478 |
| 9 | Acacia woodlands | 314 | Spartina marsh | 520 | Oats | 20 |
| 10 | Acacia shrub-lands | 248 | Cattail marsh | 404 | Soybean-notill | 972 |
| 11 | Acacia grasslands | 305 | Salt marsh | 419 | Soybean-mintill | 2455 |
| 12 | Short mopane | 181 | Mud flats | 503 | Soybean-clean | 593 |
| 13 | Mixed mopane | 268 | Water | 927 | Wheat | 205 |
| 14 | Exposed soils | 95 | | | Woods | 1265 |
| 15 | | | | | Building-grass-trees-drives | 386 |
| 16 | | | | | Stone-steel-towers | 93 |

FIG. 11

| Method | VAR | Mean | Peak | Training Application 122 |
|---|---|---|---|---|
| $Exp_1$ | 84.91 | 80.60 | 87.42 | 89.88 |
| $Exp_2$ | 84.87 | 79.01 | 86.90 | 87.02 |
| $Exp_3$ | 85.00 | 80.91 | 89.09 | 88.91 |
| $Exp_4$ | 84.43 | 81.48 | 88.87 | 86.19 |
| $Exp_5$ | 83.55 | 79.10 | 85.88 | 86.05 |
| Average | 84.55 | 80.22 | 87.63 | 87.61 |

FIG. 12

| Method | VAR | Mean | Peak | Training Application 122 |
|---|---|---|---|---|
| Exp$_1$ | 46.12 | 49.03 | 49.88 | 49.36 |
| Exp$_2$ | 35.45 | 33.78 | 28.49 | 33.34 |
| Exp$_3$ | 21.94 | 36.47 | 35.56 | 36.41 |
| Exp$_4$ | 66.03 | 66.41 | 54.13 | 62.22 |
| Exp$_5$ | 58.29 | 60.52 | 82.64 | 60.57 |
| Average | 45.57 | 49.24 | 50.14 | 48.38 |

1300

| Method | VAR | Mean | Peak | Training Application 122 |
|---|---|---|---|---|
| Exp₁ | 66.03 | 83.58 | 80.42 | 85.00 |
| Exp₂ | 68.08 | 83.14 | 79.35 | 84.10 |
| Exp₃ | 66.03 | 84.15 | 79.19 | 86.04 |
| Exp₄ | 72.00 | 83.91 | 81.33 | 85.30 |
| Exp₅ | 69.92 | 80.89 | 79.52 | 82.75 |
| Average | 68.41 | 83.13 | 79.96 | 84.64 |

FIG. 14

| Method | VAR | Mean | Peak | Training Application 122 |
|---|---|---|---|---|
| Exp₁ | 38.25 | 54.97 | 49.27 | 57.42 |
| Exp₂ | 36.47 | 54.38 | 50.08 | 57.87 |
| Exp₃ | 41.78 | 55.35 | 51.89 | 57.26 |
| Exp₄ | 33.46 | 53.44 | 47.00 | 56.85 |
| Exp₅ | 41.17 | 46.90 | 42.81 | 51.36 |
| Average | 38.23 | 53.01 | 48.21 | 56.15 |

FIG. 15

| 1602 | 1604 | 1606 | 1608 | 1610 | 1612 | 1614 | 1616 | 1618 |
|---|---|---|---|---|---|---|---|---|
| 1 | Alfalfa | 46 | 6.25 | 12.50 | 6.25 | 6.25 | 0.38 | 8.13 |
| 2 | Corn-notill | 1428 | 45.50 | 54.10 | 46.40 | 55.50 | 42.90 | 48.88 |
| 3 | Corn-mintill | 830 | 20.31 | 37.52 | 13.77 | 38.04 | 14.46 | 24.82 |
| 4 | Corn | 237 | 68.07 | 53.61 | 72.89 | 72.29 | 68.67 | 67.11 |
| 5 | Grass-pasture | 483 | 78.99 | 83.43 | 78.99 | 82.84 | 68.34 | 78.52 |
| 6 | Grass-trees | 730 | 72.21 | 54.99 | 51.86 | 50.10 | 60.47 | 57.93 |
| 7 | Grass-pasture-mowed | 28 | 0 | 0 | 30.00 | 0 | 10.00 | 8.00 |
| 8 | Hay-windrowed | 478 | 96.72 | 97.61 | 97.91 | 98.21 | 98.21 | 97.73 |
| 9 | Oats | 20 | 0 | 0 | 0 | 7.14 | 0 | 1.43 |
| 10 | Soybean-notill | 972 | 32.65 | 38.38 | 30.88 | 27.21 | 26.76 | 31.18 |
| 11 | Soybean-mintill | 2455 | 46.57 | 43.42 | 55.41 | 41.85 | 32.89 | 44.03 |
| 12 | Soybean-clean | 593 | 78.31 | 75.42 | 76.14 | 68.67 | 81.93 | 76.10 |
| 13 | Wheat | 205 | 41.06 | 14.69 | 23.78 | 38.46 | 23.08 | 28.39 |
| 14 | Woods | 1265 | 94.46 | 92.77 | 93.56 | 93.33 | 80.17 | 92.86 |
| 15 | Building-grass-trees-drives | 386 | 68.52 | 72.96 | 69.26 | 74.81 | 80.37 | 73.19 |
| 16 | Stone-steel-towers | 93 | 66.15 | 76.92 | 72.31 | 64.62 | 73.85 | 70.77 |

FIG. 16

BANDWIDTH SELECTION IN SUPPORT VECTOR DATA DESCRIPTION FOR CLASSIFICATION OR OUTLIER DETECTION

CROSS-REFERENCE TO RELATED APPLICATIONS

The present application claims the benefit of 35 U.S.C. § 119(e) to U.S. Provisional Patent Application No. 62/650,263 filed on Mar. 29, 2018, the entire contents of which is hereby incorporated by reference. The present application also claims the benefit of 35 U.S.C. § 119(e) to U.S. Provisional Patent Application No. 62/669,366 filed on May 9, 2018, the entire contents of which is hereby incorporated by reference.

The present application is also a continuation-in-part of U.S. patent application Ser. No. 15/887,037 that was filed Feb. 2, 2018, the entire contents of which is hereby incorporated by reference. The present application also claims the benefit of 35 U.S.C. § 119(e) to U.S. Provisional Patent Application No. 62/542,006 filed on Aug. 7, 2017, the entire contents of which is hereby incorporated by reference. The present application also claims the benefit of 35 U.S.C. § 119(e) to U.S. Provisional Patent Application No. 62/544,879 filed on Aug. 13, 2017, the entire contents of which is hereby incorporated by reference.

BACKGROUND

Support vector data description (SVDD) is a machine-learning technique used for single class classification and outlier or anomaly detection. The SVDD classifier partitions the whole space into an inlier region which consists of the region near the training data, and an outlier region which consists of points away from the training data. The computation of the SVDD classifier uses a kernel function with the Gaussian kernel being a common choice for the kernel function. The Gaussian kernel has a bandwidth parameter, and it is important to set the value of this parameter correctly for good results. A small bandwidth leads to over-fitting and the resulting SVDD classifier overestimates the number of anomalies, while a large bandwidth leads to under-fitting and the resulting SVDD classifier underestimates the number of anomalies resulting in possibly many anomalies or outliers not being detected by the classifier.

SUMMARY

In an example embodiment, a non-transitory computer-readable medium is provided having stored thereon computer-readable instructions that, when executed by a computing device, cause the computing device to determine a bandwidth parameter value for a support vector data description. A mean pairwise distance value is computed between a plurality of observation vectors. A tolerance value is computed based on a number of the plurality of observation vectors. A scaling factor value is computed based on the number of the plurality of observation vectors and the computed tolerance value. A Gaussian bandwidth parameter value is computed using the computed mean pairwise distance value and the computed scaling factor value. An optimal value of an objective function is computed that includes a Gaussian kernel function that uses the computed Gaussian bandwidth parameter value. The objective function defines a support vector data description model using the plurality of observation vectors to define a set of support vectors. The Gaussian bandwidth parameter value and the set of support vectors are output for determining if a new observation vector is an outlier or for classifying the new observation vector In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine the bandwidth parameter value for the support vector data description.

In yet another example embodiment, a method of determining the bandwidth parameter value for the support vector data description is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 11 provides a table that lists a plurality of classes and a sample size for each class of the three test datasets in accordance with an illustrative embodiment.

FIG. 12 provides a table that lists a performance from five different experiments using four different methods for a first dataset of the three test datasets in accordance with an illustrative embodiment.

FIG. 14 provides a table that lists a performance from five different experiments using four different methods for the second dataset of the three test datasets after pre-processing in accordance with an illustrative embodiment.

FIG. 15 provides a table that lists a performance from five different experiments using four different methods for a third dataset of the three test datasets in accordance with an illustrative embodiment.

FIG. 16 provides a table that lists an accuracy in assigning observation vectors to each class of the third dataset for the five different experiments using the SVDD training device of FIG. 1 and the classification device of FIG. 7 in accordance with an illustrative embodiment.

DETAILED DESCRIPTION

Hyperspectral remote sensing has been an active research area for the past two decades. Varying research has been done to extract useful information from hyperspectral imaging data, which are collected from airborne or spaceborne sensors. Hyperspectral imaging data has applications in different areas such as resource management, agriculture, astronomy, mineral exploration, food inspection, and environmental monitoring. Identifying the content of each pixel in 3-D hyperspectral imaging data has been a challenging problem, and various classification techniques have been studied and applied to hyperspectral data.

Support vector data description (SVDD) is used in domains where the majority of data belong to a single class, or when one of the classes is significantly undersampled. The SVDD algorithm builds a flexible boundary around the target class data that is characterized by observations that are designated as support vectors. SVDD, like other one-class classifiers, provides a geometric description of observed data. The SVDD classifier computes a distance to each point in the domain space, which is a measure of the separation of that point from training data. During scoring, if an observation is found to be a large distance from the training data, it may be an anomaly, and the user may choose to generate an alert that a system or a device is not performing as expected or a detrimental event has occurred.

Applications of SVDD include machine condition monitoring, image classification, and multivariate process control. SVDD has the advantage that no assumptions about the distribution of the data need to be made. SVDD describes the shape of the target class without prior knowledge of the specific data distribution, with observations that fall outside the data boundary flagged as potential outliers or anomalies.

To solve a multiclass classification problem for hyperspectral data, a fusion method can be used as described in Khazai, S., Safari, A., Mojaradi, B., and Homayouni, S., *Improving the svdd approach to hyperspectral image classification*, IEEE Geoscience and Remote Sensing Letters 9, 594-598 (2012)(Khazai). An SVDD is trained for each class. A new observation vector is assigned to a class based on a distance to each SVDD hypersphere center.

Figure 1:
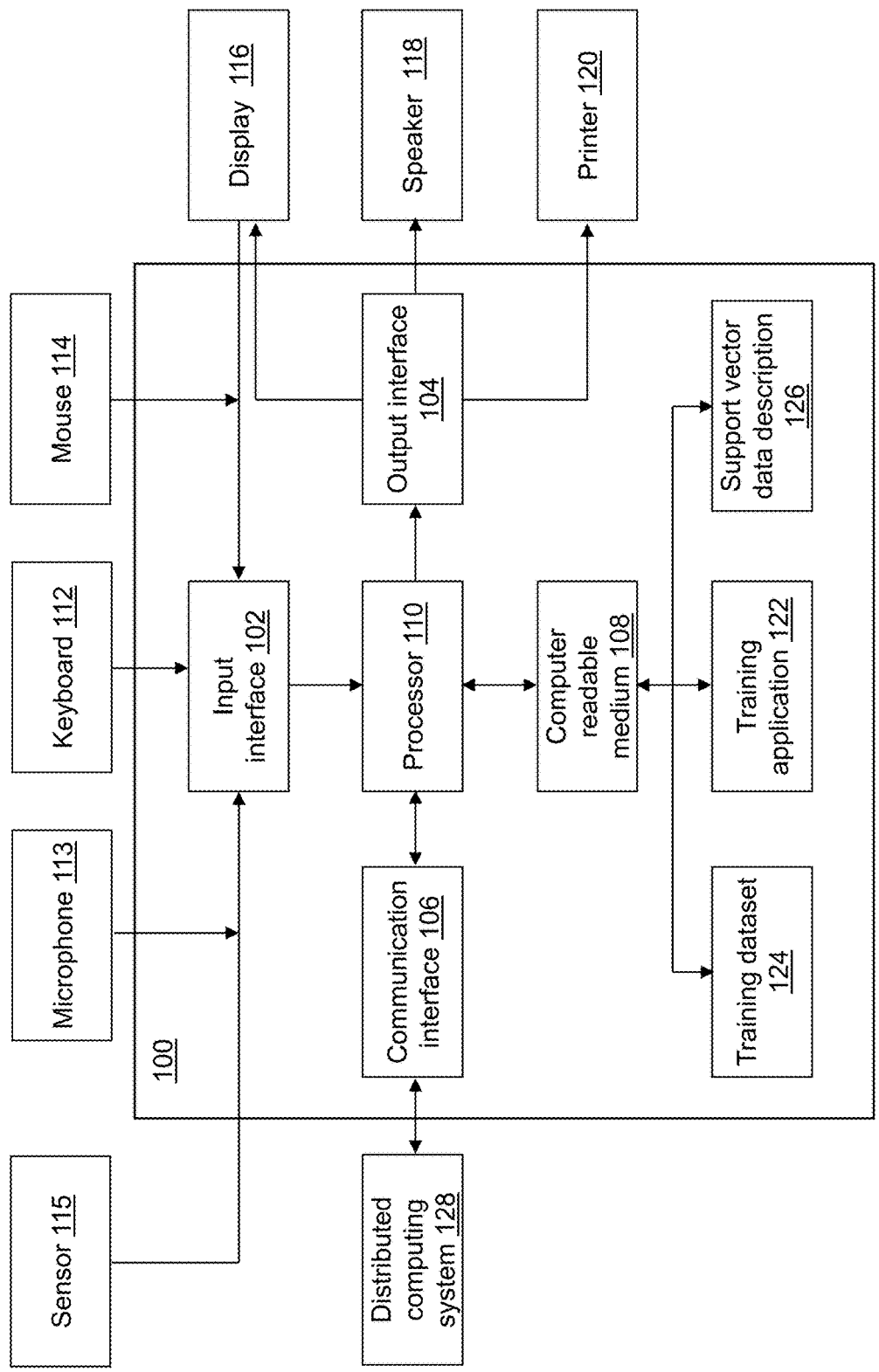
FIG. 1 depicts a block diagram of a support vector data description (SVDD) training device in accordance with an illustrative embodiment.

Referring to FIG. 1, a block diagram of an SVDD training device 100 is shown in accordance with an illustrative embodiment. SVDD training device 100 may include an input interface 102, an output interface 104, a communication interface 106, a non-transitory computer-readable medium 108, a processor 110, a training application 122, a training dataset 124, and a support vector data description (SVDD) 126. Fewer, different, and/or additional components may be incorporated into SVDD training device 100.

Input interface 102 provides an interface for receiving information from the user or another device for entry into SVDD training device 100 as understood by those skilled in the art. Input interface 102 may interface with various input technologies including, but not limited to, a keyboard 112, a microphone 113, a mouse 114, a sensor 115, a display 116, a track ball, a keypad, one or more buttons, etc. to allow the user to enter information into SVDD training device 100 or to make selections presented in a user interface displayed on display 116 or to receive input from another device. The same interface may support both input interface 102 and output interface 104. For example, display 116 comprising a touch screen provides a mechanism for user input and for presentation of output to the user. SVDD training device 100 may have one or more input interfaces that use the same or a different input interface technology. The input interface technology further may be accessible by SVDD training device 100 through communication interface 106.

Output interface 104 provides an interface for outputting information for review by a user of SVDD training device 100 and/or for use by another application or device. For example, output interface 104 may interface with various output technologies including, but not limited to, display 116, a speaker 118, a printer 120, etc. SVDD training device 100 may have one or more output interfaces that use the same or a different output interface technology. The output interface technology further may be accessible by SVDD training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. SVDD training device 100 may have one or more communication interfaces that use the same or a different communication interface technology. For example, SVDD training device 100 may support communication using an Ethernet port, a Bluetooth antenna, a telephone jack, a USB port, etc. Data and messages may be transferred between SVDD training device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. SVDD training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. SVDD training device 100 also may have one or more drives that support the loading of a memory media such as a CD, DVD, an external hard drive, etc. One or more external hard drives further may be connected to SVDD training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. SVDD training device 100 may include a plurality of processors that use the same or a different processing technology.

Some machine-learning approaches may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Training application 122 performs operations associated with computing a value for a Gaussian bandwidth parameter value s and defining SVDD 126 from data stored in training dataset 124. SVDD 126 may be used to classify data in a dataset 524 (shown referring to FIG. 7) that may be stored in a classified dataset 726 (shown referring to FIG. 7), to determine when an observation vector in dataset 524 is an outlier or otherwise anomalous vector of data (shown referring to FIG. 5) that may be stored in an outlier dataset 526 (shown referring to FIG. 5), to support various data analysis functions as well as provide alert/messaging related to monitored data. For example, an alert or message may be generated when an outlier is identified or when a specific class is identified. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, N.C., USA. For example, training application 122 may be implemented using or integrated with one or more SAS software tools such as SAS® Enterprise Miner™ Base SAS, SAS/STATO, SAS® High Performance Analytics Server, SAS® LASR™ SAS® In-Database Products, SAS® Scalable Performance Data Engine, SAS/ORO, SAS/ETSO, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. Data mining is applicable in a wide variety of industries.

Training application 122 may be integrated with other system processing tools to automatically process data generated as part of operation of an enterprise, device, system, facility, etc., to identify any outliers in the processed data, to monitor changes in the data, to classify data, and to provide a warning or alert associated with the monitored data using input interface 102, output interface 104, and/or communication interface 106 so that appropriate action can be initiated in response to changes in the monitored data.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. Training dataset 124 may be transposed. The plurality of variables may define multiple dimensions for each observation vector. An observation vector $x_i$ may include a value for each of the plurality of variables associated with the observation i. All or a subset of the columns may be used as variables used to define observation vector $x_i$. Each variable of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing, developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Training dataset 124 may be stored on computer-readable medium 108 or on one or more computer-readable media of a distributed computing system 128 and accessed by SVDD training device 100 using communication interface 106, input interface 102, and/or output interface 104. Data stored in training dataset 124 may be sensor measurements or signal values captured by sensor 115, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observations per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Some data may be processed with an event stream processing engine (ESPE), which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on SVDD training device 100 or on distributed computing system 128. SVDD training device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. Some systems may use SAS In-Memory Statistics for Hadoop® to read big data once and analyze it several times by persisting it in-memory for the entire session. Some systems may be of other types and configurations.

An SVDD model is used in domains where a majority of data in training dataset 124 belongs to a single class. An SVDD model for normal data description builds a minimum radius hypersphere around the data. The objective function for the SVDD model for normal data description is $$\max(\Sigma_{i=1}^{n}\alpha_i(x_i \cdot x_j) - \Sigma_{i=1}^{n}\Sigma_{j=1}^{n}\alpha_i\alpha_j(x_i \cdot x_j)), \tag{1}$$

subject to:

$$\Sigma_{i=1}^{n}\alpha_i = 1, \tag{2}$$

$$0 \le \alpha_i \le C, \forall i=1,\ldots,n, \tag{3}$$

where $x_i \in \mathbb{R}^m$, $i=1,\ldots,n$ represents n observations in training dataset 124, $\alpha_i \in \mathbb{R}$: are Lagrange constants, $C=1/nf$ is a penalty constant that controls a trade-off between a volume and errors, and f is an expected outlier fraction. The expected outlier fraction is generally known to an analyst. Data preprocessing can ensure that training dataset 124 belongs to a single class. In this case, f can be set to a very low value such as 0.001. For example, in a training phase, $C=1$ may be used such that none of the n observations are treated as outliers.

Depending upon a position of an observation vector, the following results are true:

$$\text{Center position: } \Sigma_{i=1}^{n}\alpha_i x_i = a. \tag{4}$$

$$\text{Inside position: } \|x_i - a\| < R \rightarrow \alpha_i = 0. \tag{5}$$

$$\text{Boundary position: } \|x_i - a\| = R \rightarrow 0 < \alpha_i < C. \tag{6}$$

$$\text{Outside position: } \|x_i - a\| > R \rightarrow \alpha_i = C. \tag{7}$$

where a is a center of the hypersphere and R is a radius of the hypersphere. SV is the set of support vectors that includes the observation vectors that have $C > \alpha_i$ after solving equation (1) above. $SV_{<C}$ is a subset of the support vectors that includes the observation vectors that have $C > \alpha_i > 0$ after solving equation (1) above. The $SV_{<C}$ is a subset of the support vectors located on a boundary of the minimum radius hypersphere defined around the data and are referred to herein as boundary support vectors BV.

The radius of the hypersphere is calculated using:

$$R^2 = x_k \cdot x_k - 2\sum_{i=1}^{N_{SV}} \alpha_i (x_i \cdot x_k) + \sum_{i=1}^{N_{SV}} \sum_{j=1}^{N_{SV}} \alpha_i \alpha_j (x_i \cdot x_j) \quad (8)$$

where any $x_k \in BV$, $x_i$ and $x_j$ are the support vectors, $\alpha_i$ and $\alpha_j$ are the Lagrange constants of the associated support vector, and $N_{SV}$ is a number of the support vectors included in the set of support vectors. An observation vector z is indicated as an outlier when $\text{dist}^2(z) > R^2$, where $$\text{dist}^2(z) = (z \cdot z) - 2\sum_{i=1}^{N_{SV}} \alpha_i (x_i \cdot z) + \sum_{i=1}^{N_{SV}} \sum_{j=1}^{N_{SV}} \alpha_i \alpha_j (x_i \cdot x_j). \quad (9)$$

When the outlier fraction f is very small, the penalty constant C is very large resulting in few if any observation vectors in training dataset 124 determined to be in the outside position according to equation (7).

Figure 2:
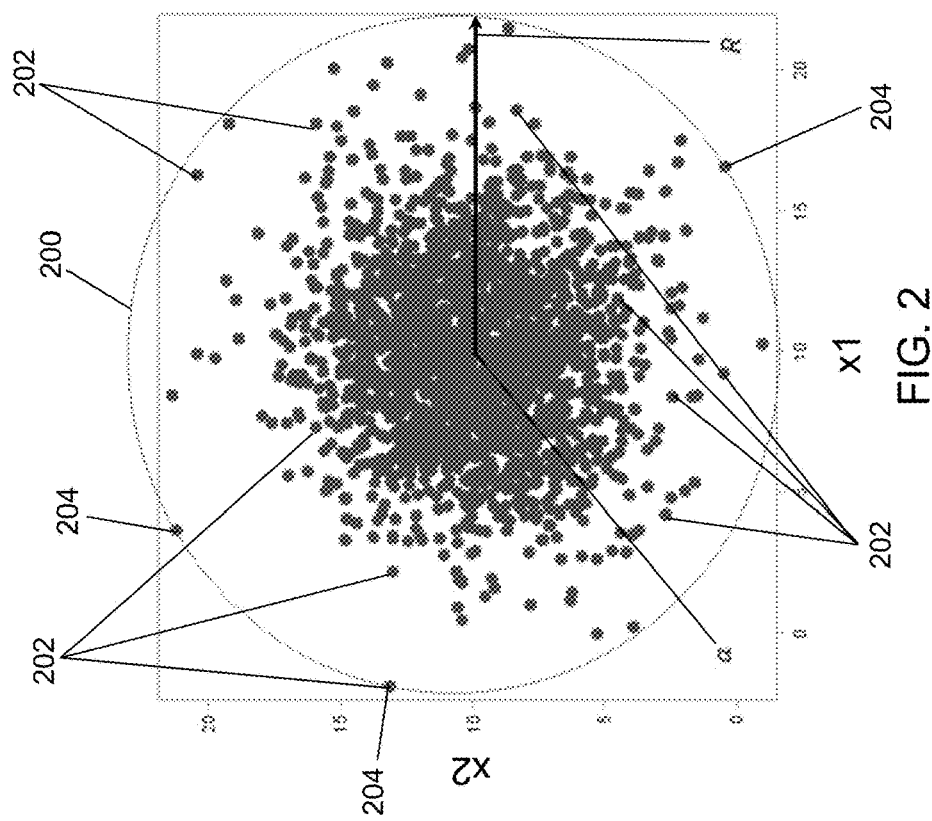
FIG. 2 depicts an SVDD result defining a normal data description in accordance with an illustrative embodiment.

Referring to FIG. 2, an SVDD is illustrated in accordance with an illustrative embodiment that defines a boundary 200 having a radius R from a center a. Boundary 200 is characterized by observation vectors 202 (shown as data points on the graph), which are the set of support vectors SV. For illustration, observation vectors 202 are defined by values of variables x1 and x2 though observation vectors 202 may include a greater number of variables. The subset of observation vectors 204 are the boundary support vectors BV on boundary 200.

Boundary 200 includes a significant amount of space with a very sparse distribution of training observations. Scoring with the model based on the set of support vectors SV that define boundary 200 can increase the probability of false positives. Instead of a circular shape, a compact bounded outline around the data that better approximates a shape of data in training dataset 124 may be preferred. This is possible using a kernel function. The SVDD is made flexible by replacing the inner product $(x_i \cdot x_j)$ with a suitable kernel function $K(x_i, x_j)$. A Gaussian kernel function is used herein. The Gaussian kernel function may be defined as:

$$K(x_i, x_j) = \exp \frac{-\|x_i - x_j\|^2}{2s^2} \quad (10)$$

where s is a Gaussian bandwidth parameter.

The objective function for the SVDD model with the Gaussian kernel function is $$\max(\sum_{i=1}^{n} \alpha_i K(x_i, x_i) \sum_{i=1}^{n} \sum_{j=1}^{n} \alpha_i \alpha_j K(x_i, x_j)), \quad (11)$$

subject to:

$$\sum_{i=1}^{n} \alpha_i = 1, \quad (12)$$

$$0 \le \alpha_i \le C, \forall i = 1, \ldots, n \quad (13)$$

where again SV is the set of support vectors that includes the observation vectors in training dataset 124 that have $C > \alpha_i \ge 0$ after solving equation (11). BV are the boundary support vectors that are the subset of the support vectors that have $C > \alpha_i > 0$ after solving equation (11) above and are positioned on the boundary.

The results from equations (4) to (7) above remain valid. A threshold R is computed using:

$$R^2 = K(x_k, x_k) - 2\sum_{i=1}^{N_{SV}} \alpha_i K(x_i, x_k) + \sum_{i=1}^{N_{SV}} \sum_{j=1}^{N_{SV}} \alpha_i \alpha_j K(x_i, x_j) \quad (14)$$

where any $x_k \in BV$, where $x_i$ and $x_j$ are the support vectors, $\alpha_i$ and $\alpha_j$ are the Lagrange constants of the associated support vector, and $N_{SV}$ is the number of the support vectors included in the set of support vectors.

An observation vector z is indicated as an outlier when $\text{dist}^2(z) > R^2$, where $$\text{dist}^2(z) = K(z, z) - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j). \quad (15)$$

$\sum_{i=1}^{N_{SV}} \sum_{j=1}^{N_{SV}} \alpha_i \alpha_j K(x_i, x_j)$ is a constant that can be denoted as G and that can be determined from the set of support vectors. $R^2$ is a threshold determined using the set of support vectors. For a Gaussian kernel function, $K(z, z) = 1$. Thus, equation (14) can be simplified to $R^2 = 1 - 2\sum_{i=1}^{N_{SV}} \alpha_i K(x_i, x_k) + G$ for a Gaussian kernel function. Equation (15) can be simplified to $\text{dist}^2(z) = 1 - 2\sum_{i=1}^{N_{SV}} \alpha_i K(x_i, z) + G$ for a Gaussian kernel function.

Figure 3:
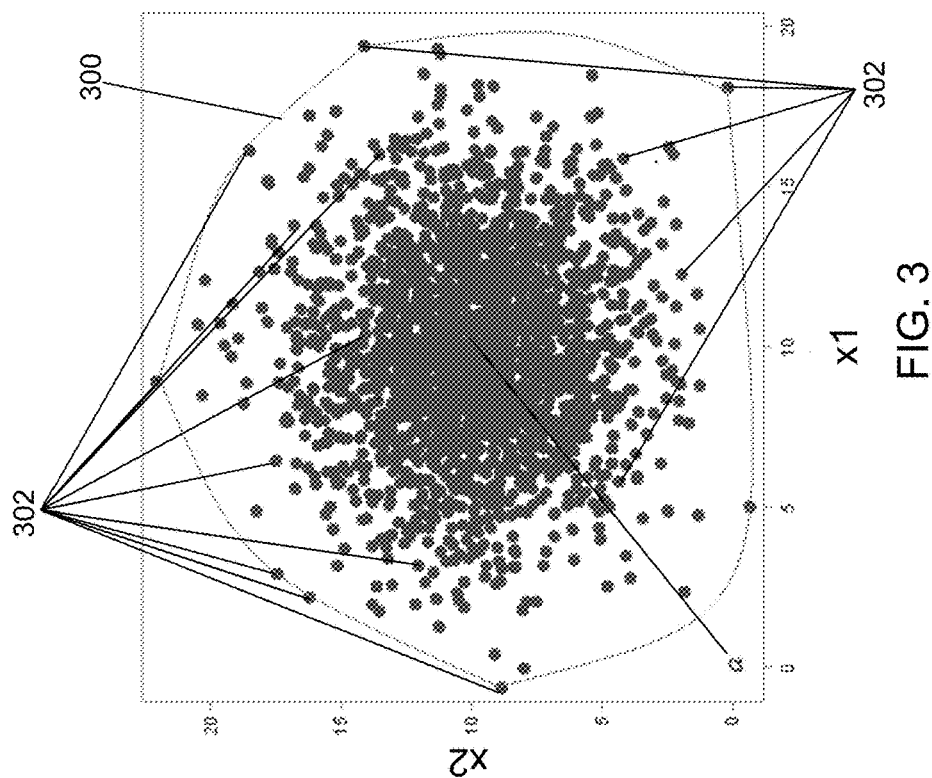
FIG. 3 depicts an SVDD result defining a flexible data description using a Gaussian kernel function in accordance with an illustrative embodiment.

Referring to FIG. 3, a SVDD is shown in accordance with an illustrative embodiment that defines a flexible boundary 300. The SVDD is characterized by support vectors 302, which are the set of support vectors SV. The BV are the subset of support vectors SV shown on flexible boundary 300.

Figure 4A:
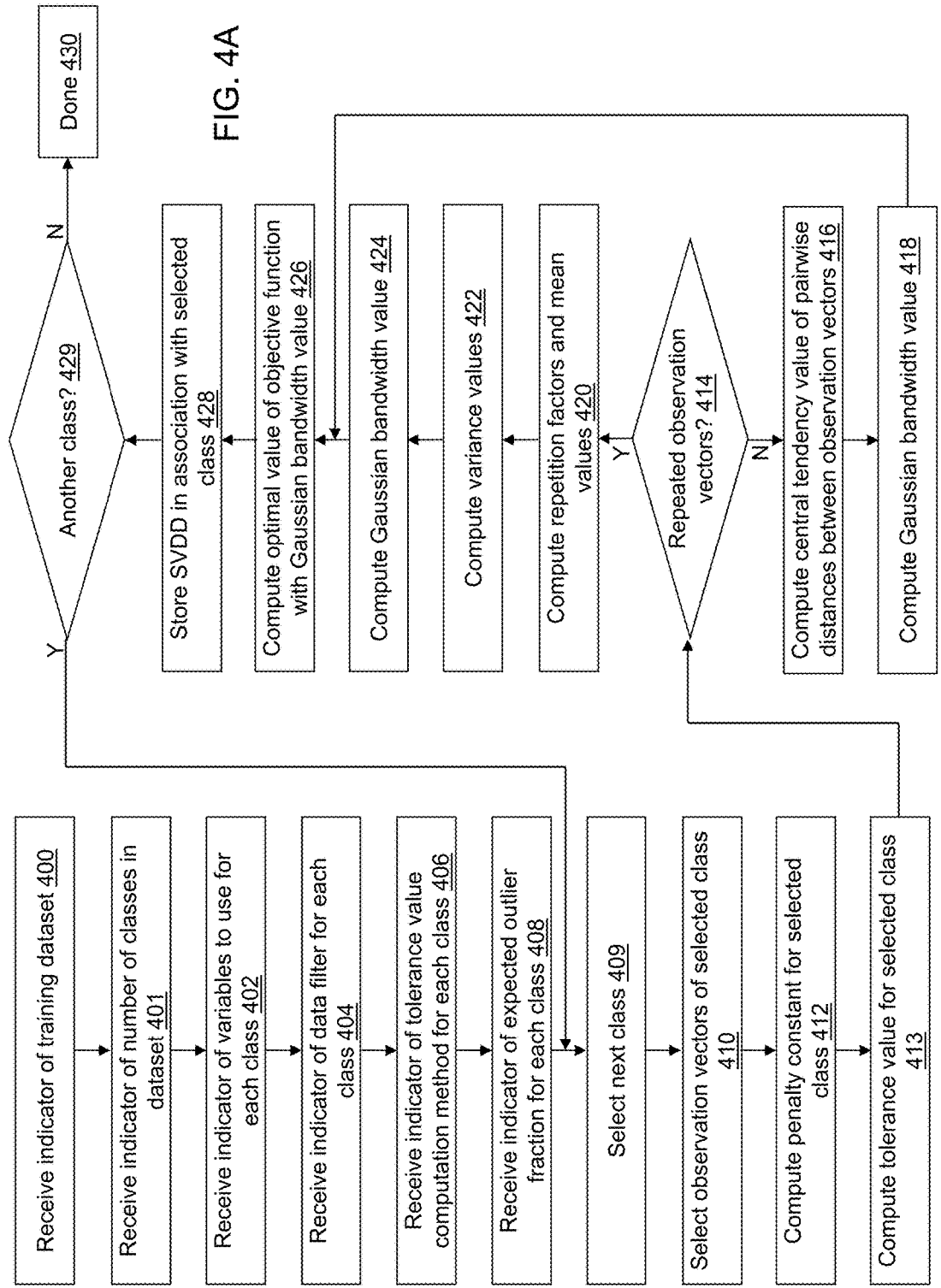
FIGS. 4A to 4B depict a flow diagram illustrating examples of operations performed by the SVDD training device of FIG. 1 in accordance with an illustrative embodiment.
Figure 4B:
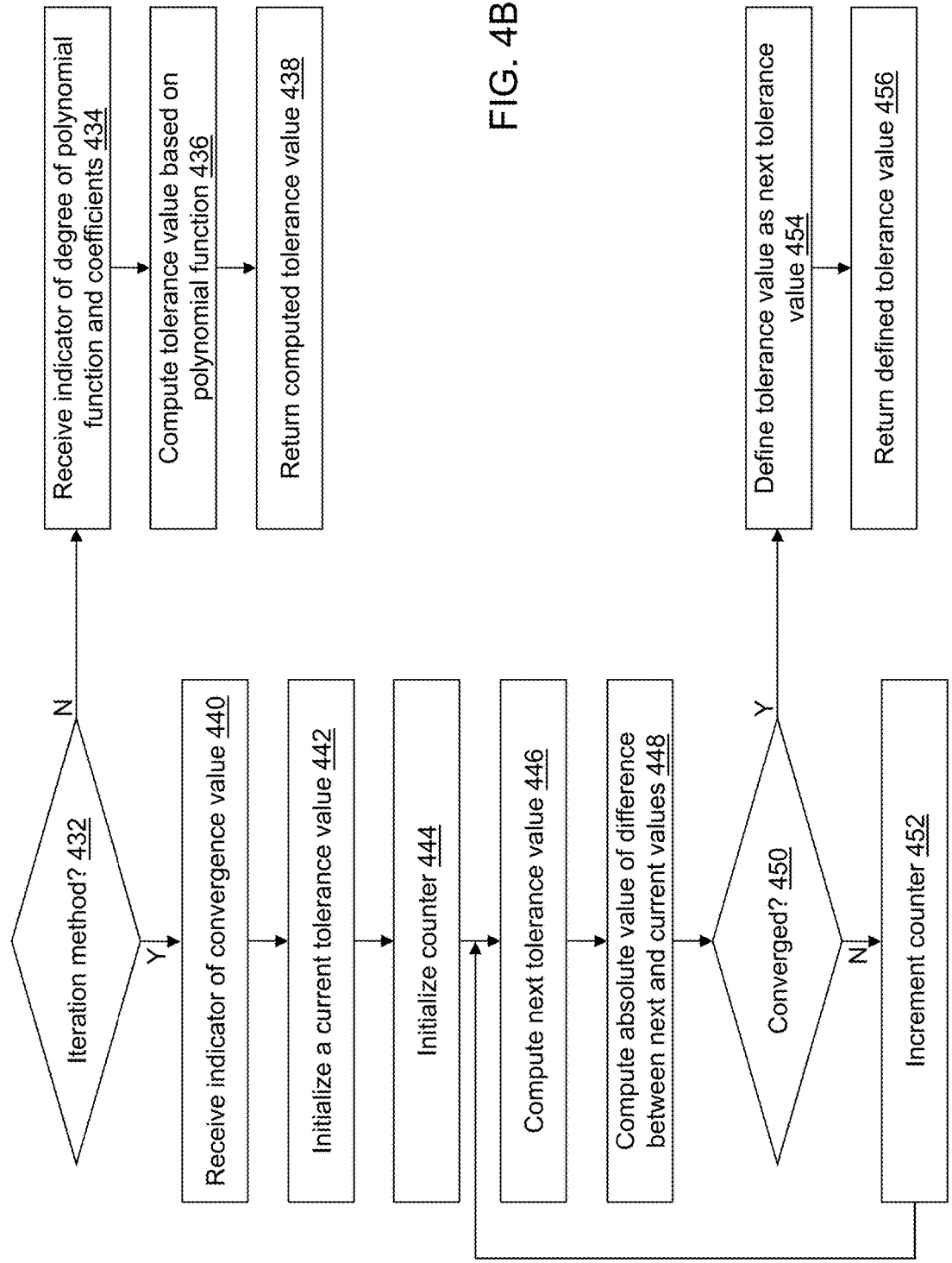

Referring to FIGS. 4A and 4B, example operations associated with training application 122 are described. For example, training application 122 may be used to compute a value for the Gaussian bandwidth parameter s and to compute SVDD 126 from training dataset 124. Additional, fewer, or different operations may be performed depending on the embodiment of training application 122. The order of presentation of the operations of FIGS. 4A and 4B is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute training application 122, which causes presentation of a first user interface window, which may include a plurality of menus and selectors such as drop down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by training application 122.

Referring to FIG. 4A, in an operation 400, a first indicator may be received that indicates training dataset 124. For example, the first indicator indicates a location and a name of training dataset 124. As an example, the first indicator may be received by training application 122 after selection from a user interface window or after entry by a user into a user interface window. In an alternative embodiment, training dataset 124 may not be selectable. For example, a most recently created dataset may be used automatically.

In an operation 401, a second indicator of a number of classes M may be received. In an alternative embodiment, the second indicator may not be received. For example, a default value may be stored, for example, in computer-readable medium 108 and used automatically. In another alternative embodiment, the value of the number of classes M may not be selectable. Instead, the value may be determined based on reading training dataset 124 for unique values in a column designated to indicate a class for the associated observation vector.

In an operation 402, a third indicator may be received that indicates a plurality of variables of training dataset 124 to define $x_i$ for each class. The third indicator may indicate that all or only a subset of the variables stored in training dataset 124 be used to define SVDD 126. For example, the third indicator indicates a list of variables to use by name, column number, etc. In an alternative embodiment, the third indicator may not be received. For example, all of the variables may be used automatically. The plurality of variables of training dataset 124 to define $x_i$ may be the same for each class.

In an operation 404, a fourth indicator is received that indicates a data filter to identify the plurality of observations of training dataset 124 of each class. The fourth indicator may indicate one or more rules associated with selection of an observation from the plurality of observations of training dataset 124 and association with a specific class of the classes m=1, ..., M or may indicate a class name. As an example, data may be captured for a vibration level of a washing machine. A washing machine mode, such as "fill", "wash", "spin", etc. may be captured with each mode associated with a different class. Because a "normal" vibration level may be different dependent on the washing machine mode, a subset of data may be selected for a specific washing machine mode setting based on a value in a column of training dataset 124 that defines the washing machine mode, which defines the class for the observation. For example, SVDD models may be defined for different modes of the machine that define different classes such that the data filter identifies a column indicating the washing machine mode and which value(s) is(are) used to define the SVDD model for each class. The data filter may be used to separate the data into classes. In an alternative embodiment, the fourth indicator may not be received. For example, no filtering of the plurality of observations may be applied such that training dataset 124 includes a single class and M=1.

In an operation 406, a fifth indicator of a computation method for a tolerance value δ may be received. For example, the fifth indicator indicates a name of a computation method. The fifth indicator may be received by training application 122 after selection from a user interface window or after entry by a user into a user interface window. As an example, a computation method may be selected from "Iteration", "Polynomial Function", etc. Of course, the computation method may be labeled or selected in a variety of different manners by the user as understood by a person of skill in the art. In an alternative embodiment, the computation method may not be selectable, and a single computation method is implemented in training application 122.

In an operation 408, a sixth indicator of a value of the expected outlier fraction f may be received for each class. In an alternative embodiment, the sixth indicator may not be received. For example, a default value may be stored, for example, in computer-readable medium 108 and used automatically. In another alternative embodiment, the value of the expected outlier fraction f may not be selectable. Instead, a fixed, predefined value may be used. The expected outlier fraction f may be the same for each class.

In an operation 409, a next class of the number of classes M is selected. For example, an index m may increment from one to the number of classes M with each execution of operation 409 to process each class separately.

In an operation 410, the observation vectors of the selected class are selected from training dataset 124 after applying the data filter indicated in operation 404, if any, to define a selected set of observation vectors X, where $x_i \in X$, and $x_i$, i=1, ..., N, where N is a number of observation vectors of the selected set of observation vectors X. The index i may be associated with a field value of the plurality of variables selected in operation 402.

In an operation 412, a value of the penalty constant C=1/Nf may be computed from N and f or may be set to C=1 for training.

In an operation 413, a value for the tolerance value δ is computed using the computation method selected in operation 406 or the default computation method. The computation methods are based on the observation that a good classification performance typically occurs when $\partial \bar{s}$ (N,δ)≈ $\partial δ$, which is equivalent to $\bar{s}(N,δ)^3=δ$, where $$\bar{s}(N, \delta) = \sqrt{\frac{1}{\ln\left(\frac{N-1}{\delta^2}\right)}} = [\ln(N-1) - 2\ln(\delta)]^{-0.5}.$$

For example, referring to FIG. 4B, in an operation 432, a determination is made concerning which tolerance value computation method was selected, if any. Of course, when the tolerance value computation method is not selectable, this determination is not performed. Instead, processing continues in an operation 434 or an operation 440 depending on which method is implemented. When the "Iteration" method is selected or implemented for the tolerance value computation method, processing continues in operation 440. When the "Polynomial Function" method is selected or implemented for the tolerance value computation method, processing continues in operation 434.

Figure 4C:
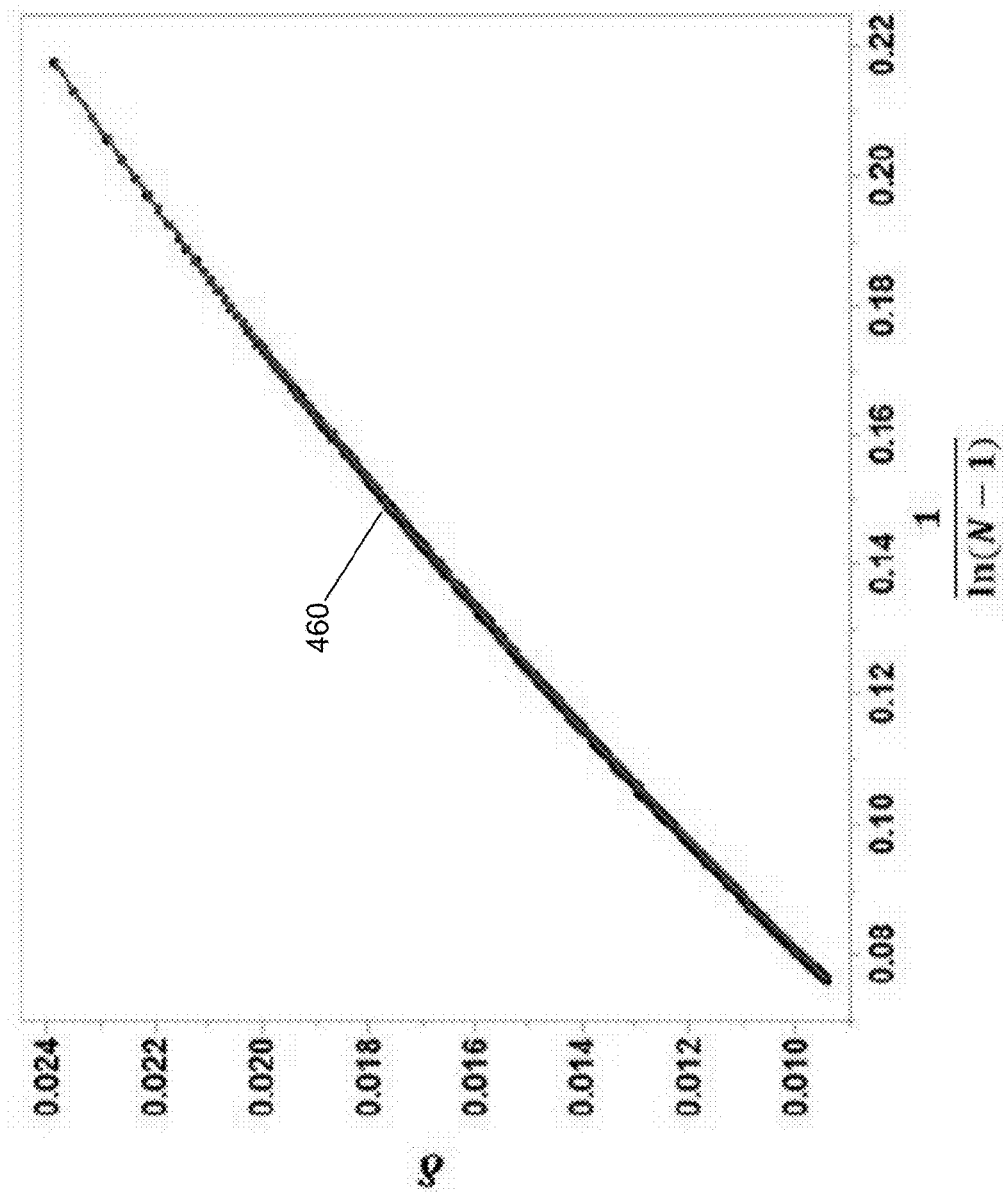
FIG. 4C depicts a relationship between a tolerance value and a value of $1/\ln(N-1)$ for different values of N in accordance with an illustrative embodiment.

In operation 434, a seventh indicator of a degree of the polynomial function and its coefficients is received. For illustration, referring to FIG. 4C, a curve 460 defines a relationship between the tolerance value δ and a value of 1/ln(N−1) for different values of N in accordance with an illustrative embodiment. A polynomial function can be fit to curve 460 to define a polynomial function. For example, $\delta=0.14818008\phi^4+0.284623624\phi^3-0.252853808\phi^2+0.159059498\phi-0.001381145$, defines an illustrative polynomial function that is a monomial function in ϕ and has degree four, where ϕ=1/ln(N−1) defines the parameter used by the polynomial function. For the example polynomial function, the indicator may include the degree value equal to four and the coefficients in descending order listed as {−0.14818008, 0.284623624,−0.252853808, 0.159059498, 0.001381145}. Of course, a higher or a lower degree may be used to define a different polynomial function that approximates curve 460 based on achieving a desired curve fit error though the degree should be greater than one to define a curve instead of a line. Additionally, the coefficients may be truncated to include a fewer or a greater number of decimal places. The polynomial function further may be defined in other manners such as in ascending order and/or without specifying the degree value. As another example, data points that describe the tolerance value δ as a function of a parameter, such as ϕ=1/ln(N−1), may be input, and the curve fit may be performed by training application 122 given a desired curve fit error and/or degree to define the polynomial function used to compute the tolerance value δ.

Referring again to FIG. 4B, in an operation 436, the tolerance value δ is computed using the defined polynomial function and the defined parameter.

In an operation 438, the computed tolerance value is returned for use in subsequent processing in FIG. 4A.

In operation 440, an eighth indicator of a convergence value $c_v$ is received.

In an operation 442, a current tolerance value $\delta_0$ for the tolerance value $\delta$ is initialized, for example, to one such that $\delta_0=1$.

In an operation 444, a counter n is initialized, for example, to zero such that n=0.

In an operation 446, a next tolerance value is computed using $\delta_{n+1}=[\ln(N-1)-2\ln(\delta_n)]^{-1.5}$, where $\delta_{n+1}$ is the next tolerance value, and $\delta_n$ is the current tolerance value.

In an operation 448, an absolute value of a difference between the next and the current tolerance values is computed using $\Delta=|\delta_{n+1}-\delta_n|$.

In an operation 450, a determination is made concerning whether or not computation of the tolerance value $\delta$ has converged to a result. When the computation has converged, processing continues in an operation 454. When the computation has not converged, processing continues in an operation 452. For example, when $\Delta \leq c_v$, the determination may be that computation of the tolerance value $\delta$ has converged to the next tolerance value $\delta_{n+1}$. Convergence may also be determined when $n > c_v$ such that a predefined number of iterations have been performed.

In operation 452, the counter n is incremented, for example, using n=n+1, and processing continues in operation 446 to compute the next tolerance value. Of course, when the counter n is incremented, the current tolerance value $\delta_n$ is effectively replaced with the next tolerance value $\delta_{n+1}$ before computing the next tolerance value in operation 446.

In operation 454, the tolerance value $\delta$ is defined as the next tolerance value $\delta_{n+1}$ such that $\delta=\delta_{n+1}$.

In an operation 456, the defined tolerance value is returned for use in subsequent processing in FIG. 4A.

Referring again to FIG. 4A, in an operation 414, a determination is made concerning whether or not any $x_i$ of the selected set of observation vectors X is a repeat of another observation vector $x_j$. When at least one observation vector is repeated, processing continues in an operation 420. When the observation vectors are each unique, processing continues in an operation 416.

In operation 416, a central tendency value is computed for pairwise distances between observation vectors. In an illustrative embodiment, a mean pairwise distance $\overline{D}$ is computed using $$\overline{D}^2 = \sum_{i<j} \|x_i - x_j\|^2 \bigg/ \binom{N}{2} = \frac{2N}{(N-1)} \sum_{j=1}^{p} \sigma_j^2,$$

$$i=1,\ldots,N \text{ and } j=1,\ldots,N,$$

where p is a number of variables that define each observation vector $x_i$ and $\sigma_j^2$ is a variance of each variable of the number of variables indicated in operation 402 for the selected class. For illustration, each $\sigma_j^2$ is computed using $$\sigma_1^2 = \frac{\sum_{i=1}^{N}(x_{i1}-\mu_1)^2}{N},$$

where $$\mu_1 = \frac{\sum_{i=1}^{N} x_{i1}}{N}$$

is a mean value computed for a first variable from each observation vector value for the first variable of the selected set of observation vectors $$X, \ldots, \sigma_{1p}^2 = \frac{\sum_{i=1}^{N}(x_{ip}-\mu_p)^2}{N},$$

where $$\mu_p = \frac{\sum_{i=1}^{N} x_{ip}}{N}$$

is a mean value computed for a pth variable from each observation vector value for the pth variable of the selected set of observation vectors X. Because the column variances can be calculated in one pass through the selected set of observation vectors X, the computation of mean pairwise distance $\overline{D}$ is an $\mathcal{O}(Np)$ algorithm.

In another illustrative embodiment, a median pairwise distance $D_{md}$ is computed using $D_{md}=\text{median}_{i<j}\|x_i-x_j\|$, $i=1,\ldots,N$ and $j=1,\ldots,N$. The user may select either mean pairwise distance $\overline{D}$ or median pairwise distance $D_{md}$ to use or a single pairwise distance value may be used without user selection.

In an operation 418, the Gaussian bandwidth parameters is computed from either mean pairwise distance $\overline{D}$ or median pairwise distance $D_{md}$ and a scaling factor F, where $F=1/\sqrt{\ln[(N-1)/\delta^2]}$. For example, $s=\sqrt{\overline{D}^2/\ln[(N-1)/\delta^2]}=\overline{D}F$ or $s=D_{md}/\sqrt{\ln[(N-1)/\delta^2]}=D_{md}F$, and processing continues in an operation 426. As a result, the Gaussian bandwidth parameter s is computed as the scaling factor F multiplied by the computed central tendency value that is either mean pairwise distance D or median pairwise distance $D_{md}$.

In operation 420, repetition weight factors, W, M, and Q, are computed from a repetition vector $w_i$ where $x_i$ is repeated $w_i>0$ times and i=1, N. $W=\sum_{i=1}^{N} w_i$, $M=\sum_{i=1}^{N} w_i$, ..., and $Q=(W^2-M)/2$, where $\{x_1,\ldots,x_N\}$ are the distinct observation vectors included in the selected set of observation vectors X.

In an operation 422, a variance value $\sigma^{-2}$ is computed from the selected set of observation vectors X, where $\sigma^{-2}=\sum_{i=1}^{P} \sigma_i^2$, where each $\sigma^2$ is computed using $$\sigma_1^2 = \frac{\sum_{i=1}^{N} w_i(x_{i1}-\mu_1)^2}{W}, \ldots, \sigma_p^2 = \frac{\sum_{i=1}^{N} w_i\|x_{ip}-\mu_p\|^2}{W},$$

where $$\mu_1 = \frac{\sum_{i=1}^{N} w_i x_{i1}}{W}, \ldots, \mu_p = \frac{\sum_{i=1}^{N} w_i x_{ip}}{W}$$

where p is the number of variables that define each observation vector $x_i$.

In an operation 424, the Gaussian bandwidth parameter s is computed from the variance value $\sigma^2$ and a weighted scaling factor $F_W$, where $F_W=W/\sqrt{Q\times\ln[(N-1)/\delta^2]}$. For example, $s=\sigma F_W$, where $\sigma=\sqrt{\sigma^2}$, and processing continues in operation 426.

In operation 426, an optimal value is computed for the objective function of the SVDD model using the Gaussian kernel function with the computed Gaussian bandwidth parameter s and the selected set of observation vectors X. For example, equations (11)-(13) above are used to solve for SV, a set of support vectors that have $0 \leq \alpha_i < C$, and a set of boundary support vectors BV that have $0 < \alpha_i < C$. Values for the Lagrange constants $\alpha_i$ for each support vector of the set of support vectors, for $R^2$ using equation (14), and for the center position a using equation (4) are computed as part of the optimal solution. Only the BV are needed for the computations of $R^2$, and only the SV are needed for the computation of a.

In an operation 428, the set of support vectors SV, the set of boundary support vectors BV, the Lagrange constants $\alpha_i$ for each support vector of the set of support vectors SV, the center position a, and/or $R^2$ computed from the set of support vectors may be stored in SVDD 126 in association with the computed Gaussian bandwidth parameter s and an indicator of the selected class.

In an operation 429, a determination is made concerning whether or not there is another class of the number of classes M to process. When there is another class, processing continues in operation 409 to select the next class. When there is not another class, processing continues in an operation 430.

In operation 430, processing is complete for defining SVDD 126 with the Gaussian bandwidth parameter s computed using the computed tolerance value δ for each class.

Figure 5:
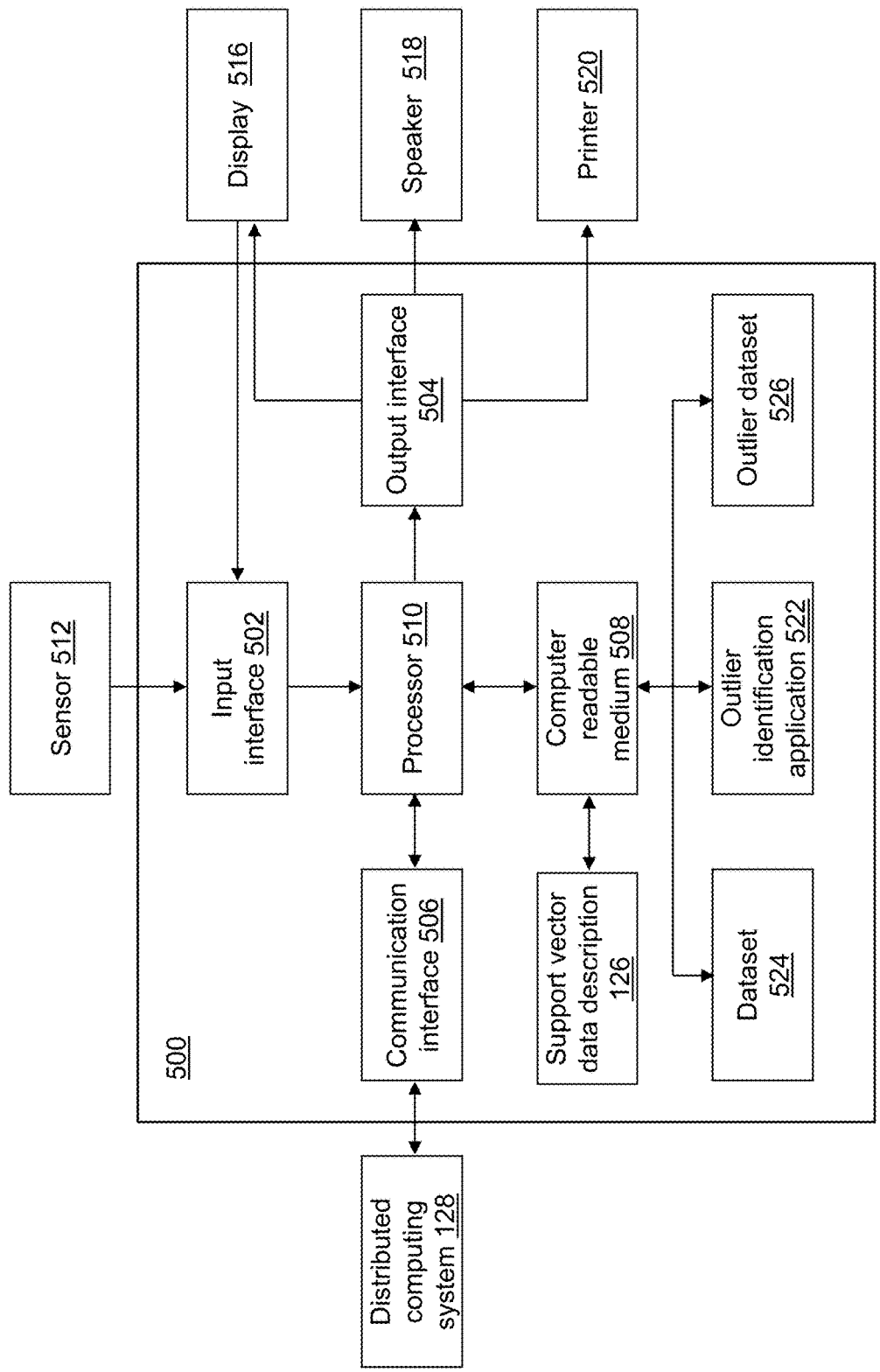
FIG. 5 depicts a block diagram of an outlier identification device in accordance with an illustrative embodiment.

Referring to FIG. 5, a block diagram of an outlier identification device 500 is shown in accordance with an illustrative embodiment. Outlier identification device 500 may include a second input interface 502, a second output interface 504, a second communication interface 506, a second non-transitory computer-readable medium 508, a second processor 510, an outlier identification application 522, SVDD 126, a dataset 524, and an outlier dataset 526. Fewer, different, and/or additional components may be incorporated into outlier identification device 500. Outlier identification device 500 and SVDD training device 100 may be the same or different devices.

Second input interface 502 provides the same or similar functionality as that described with reference to input interface 102 of SVDD training device 100 though referring to outlier identification device 500. Second output interface 504 provides the same or similar functionality as that described with reference to output interface 104 of SVDD training device 100 though referring to outlier identification device 500. Second communication interface 506 provides the same or similar functionality as that described with reference to communication interface 106 of SVDD training device 100 though referring to outlier identification device 500. Data and messages may be transferred between outlier identification device 500 and distributed computing system 128 using second communication interface 506. Second computer-readable medium 508 provides the same or similar functionality as that described with reference to computer-readable medium 108 of SVDD training device 100 though referring to outlier identification device 500. Second processor 510 provides the same or similar functionality as that described with reference to processor 110 of SVDD training device 100 though referring to outlier identification device 500.

Outlier identification application 522 performs operations associated with creating outlier dataset 526 from data stored in dataset 524 using SVDD 126. SVDD 126 may be used to identify outliers in dataset 524 that are then stored in outlier dataset 526 to support various data analysis functions as well as provide alert/messaging related to the identified outliers stored in outlier dataset 526. Dependent on the type of data stored in training dataset 124 and dataset 524, outlier dataset 526 may identify anomalies as part of process control, for example, of a manufacturing process, for machine condition monitoring, for example, of an electro-cardiogram device, etc. Some or all of the operations described herein may be embodied in outlier identification application 522. The operations may be implemented using hardware, firmware, software, or any combination of these methods.

Referring to the example embodiment of FIG. 5, outlier identification application 522 is implemented in software (comprised of computer-readable and/or computer-executable instructions) stored in second computer-readable medium 508 and accessible by second processor 510 for execution of the instructions that embody the operations of outlier identification application 522. Outlier identification application 522 may be written using one or more programming languages, assembly languages, scripting languages, etc. Outlier identification application 522 may be integrated with other analytic tools. For example, outlier identification application 522 may be part of SAS® Enterprise Miner™ and/or SAS® Viya™ developed and provided by SAS Institute Inc. of Cary, N.C. that may be used to create highly accurate predictive and descriptive models based on analysis of vast amounts of data from across an enterprise. Outlier identification application 522 further may be incorporated into SAS® Event Stream Processing.

Outlier identification application 522 may be implemented as a Web application. Outlier identification application 522 may be integrated with other system processing tools to automatically process data generated as part of operation of an enterprise, to identify any outliers in the processed data, and to provide a warning or alert associated with identification of an outlier using second input interface 502, second output interface 504, and/or second communication interface 506 so that appropriate action can be initiated in response to the outlier identification. Outlier identification application 522 and training application 122 further may be integrated applications.

Training dataset 124 and dataset 524 may be generated, stored, and accessed using the same or different mechanisms. Similar to training dataset 124, dataset 524 may include a plurality of rows and a plurality of columns with the plurality of rows referred to as observations or records, and the columns referred to as variables that are associated with an observation. Dataset 524 may be transposed.

Similar to training dataset 124, dataset 524 may be stored on second computer-readable medium 508 or on one or more computer-readable media of distributed computing system 128 and accessed by outlier identification device 500 using second communication interface 506. Data stored in dataset 524 may be a sensor measurement or a data communication value, may be generated or captured in response to occurrence of an event or a transaction, generated by a device such as in response to an interaction by a user with the device, etc. The data stored in dataset 524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in dataset 524 may be captured at different time points periodically or intermittently, when an event occurs, etc. One or more columns may include a time value. Similar to training dataset 124, data stored in dataset 524 may be generated as part of the IoT, and some or all data may be processed with an ESPE.

Similar to training dataset 124, dataset 524 may be stored in various compressed formats such as a coordinate format, a compressed sparse column format, a compressed sparse row format, etc. Dataset 524 further may be stored using various structures as known to those skilled in the art including a file system, a relational database, a system of tables, a structured query language database, etc. on SVDD training device 100, on outlier identification device 500, and/or on distributed computing system 128. Outlier identification device 500 and/or distributed computing system 128 may coordinate access to dataset 524 that is distributed across a plurality of computing devices. For example, dataset 524 may be stored in a cube distributed across a grid of computers as understood by a person of skill in the art. As another example, dataset 524 may be stored in a multi-node Hadoop® cluster. As another example, dataset 524 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in dataset 524.

Figure 6:
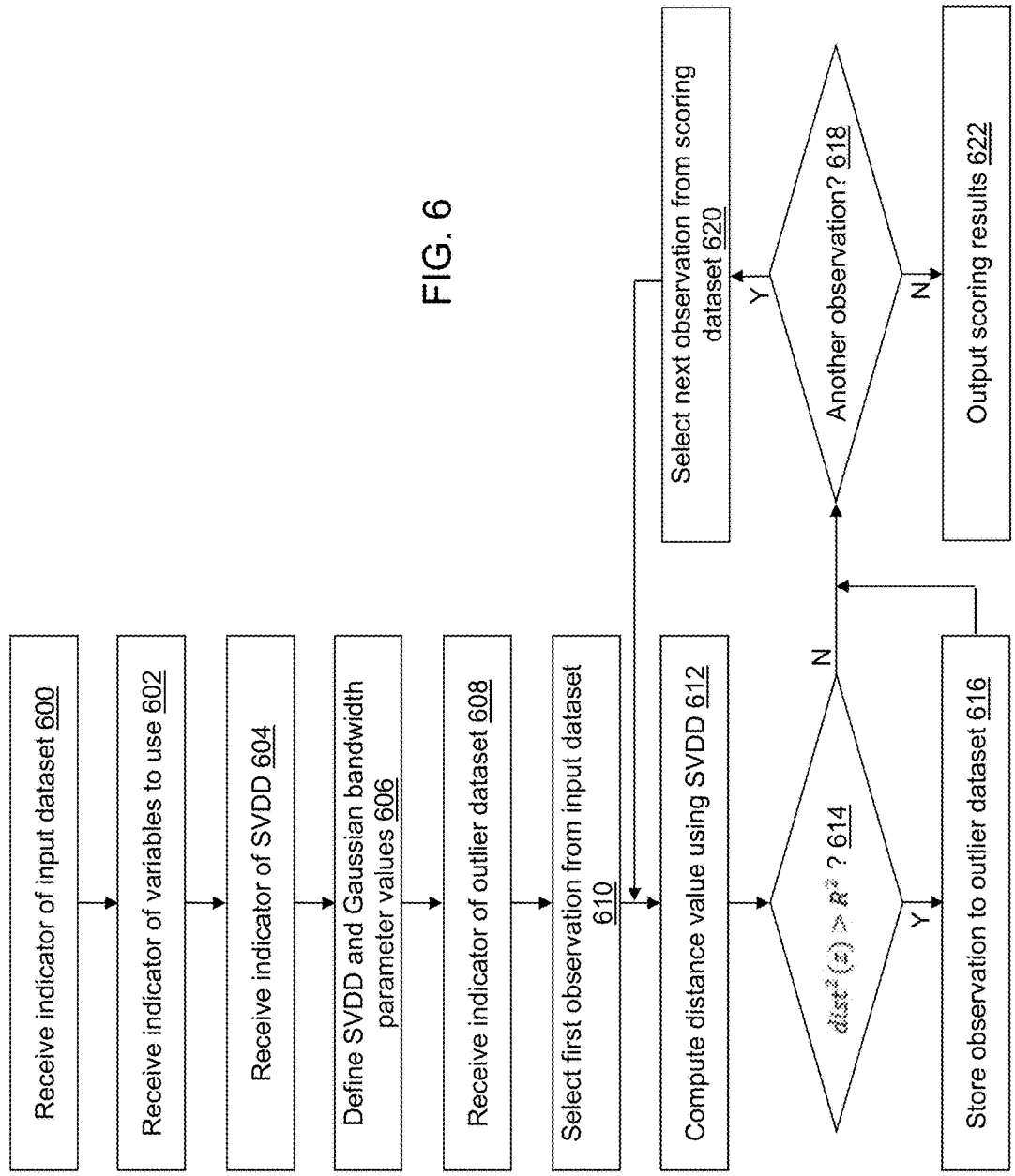
FIG. 6 depicts a flow diagram illustrating examples of operations performed by the outlier identification device of FIG. 5 in accordance with an illustrative embodiment.

Referring to FIG. 6, example operations of outlier identification application 522 to use SVDD 126 to classify dataset 524 and create outlier dataset 526 are described. Additional, fewer, or different operations may be performed depending on the embodiment of outlier identification application 522. The order of presentation of the operations of FIG. 6 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 600, a ninth indicator is received that indicates dataset 524. For example, the ninth indicator indicates a location and a name of dataset 524. As an example, the ninth indicator may be received by outlier identification application 522 after selection from a user interface window or after entry by a user into a user interface window. In an alternative embodiment, dataset 524 may not be selectable. For example, a most recently created dataset may be used automatically or observation vectors may be streamed to outlier identification application 522 from an event publishing application executing at a computing device of distributed computing system 128.

In an operation 602, a tenth indicator may be received that indicates a plurality of variables of dataset 524 to define observation vector z. The same set of the plurality of variables selected in operation 402 to define SVDD 126 are typically selected. The tenth indicator may indicate that all or only a subset of the variables stored in dataset 524 be used to determine whether the observation vector z is an outlier. For example, the tenth indicator indicates a list of variables to use by name, column number, etc. In an alternative embodiment, the tenth indicator may not be received. For example, all of the variables may be used automatically.

In an operation 604, an eleventh indicator is received that indicates SVDD 126. For example, the eleventh indicator indicates a location and a name of SVDD 126. As an example, the eleventh indicator may be received by outlier identification application 522 after selection from a user interface window or after entry by a user into a user interface window. In an alternative embodiment, SVDD 126 may not be selectable. For example, a default name and location for SVDD 126 may be used automatically.

In an operation 606, the set of support vectors SV, the Lagrange constants $\alpha_i$ for each support vector of the set of support vectors SV, the center position a, $R^2$, and the Gaussian bandwidth parameter s are defined. For example, the set of support vectors SV, the set of boundary support vectors BV, the Lagrange constants $\alpha_i$ for each support vector of the set of support vectors SV, the center position a, $R^2$, and/or the Gaussian bandwidth parameter s are read from SVDD 126 though the center position a and $R^2$ may be computed from the set of support vectors SV or the set of boundary support vectors BV and the associated Lagrange constants $\alpha_i$ instead.

In an operation 608, a twelfth indicator is received that indicates outlier dataset 526. For example, the twelfth indicator indicates a location and a name of outlier dataset 526. As an example, the twelfth indicator may be received by outlier identification application 522 after selection from a user interface window or after entry by a user into a user interface window. In an alternative embodiment, outlier dataset 526 may not be selectable. For example, a default name and location for outlier dataset 526 may be used automatically.

In an operation 610, a first observation is read from dataset 524 and selected as observation vector z. In another embodiment, the first observation may be received from another computing device in an event stream and selected as observation vector z. In still another embodiment, the first observation may be received from a sensor 512 through second input interface 502 or second communication interface 506 and selected as observation vector z.

The observation vector may include values received from a plurality of sensors of the same or different types connected to a device or mounted in a location or an area. For example, sensor 512 may produce a sensor signal value referred to as a measurement data value representative of a measure of a physical quantity in an environment to which sensor 512 is associated and generate a corresponding measurement datum that may be associated with a time that the measurement datum is generated. The environment to which sensor 512 is associated for monitoring may include a power grid system, a telecommunications system, a fluid (oil, gas, water, etc.) pipeline, a transportation system, an industrial device, a medical device, an appliance, a vehicle, a computing device, etc. Example sensor types of sensor 512 include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system.

In an operation 612, a distance value for observation vector z is computed using $dist^2(z) = K(z,z) - 2\sum_{i=1}^{N_{SV}} \alpha_i K(x_i,z) + \sum_{i=1}^{N_{SV}} \sum_{j=1}^{N_{SV}} \alpha_i \alpha_j K(x_i,x_j)$, where $K(.,.)$ is the Gaussian kernel function defined as:

$$K(x_i, x_j) = \exp\frac{-\|x_i - x_j\|^2}{2s^2}$$

where $x_i$ is any support vector of the defined set of support vectors SV, $N_{SV}$ is the number of support vectors included in the defined set of support vectors SV, and $\alpha_i$ is the Lagrange constant associated with support vector $x_i$. $G = \sum_{i=1}^{N_{SV}} \sum_{j=1}^{N_{SV}} \alpha_i \alpha_j K(x_i, x_j)$ may have been computed from the defined set of support vectors SV and the Lagrange constants $\alpha_1$ for each support vector of the set of support vectors SV and stored in SVDD 126 in operation 428 or may have been computed after operation 604 and before operation 612 to save computing resources and time. For a Gaussian kernel function, $K(z,z)=1$. Thus, computation of the distance value can be simplified to $dist^2(z) = 1 - 2\sum_{i=1}^{N_{SV}} \alpha_i K(x_i, z) + G$.

In an operation 614, a determination is made concerning whether or not $dist^2(z) > R^2$. When $dist^2(z) > R^2$, processing continues in an operation 616. When $dist^2(z) \leq R^2$, processing continues in an operation 618.

In operation 616, observation vector z and/or an indicator of observation vector z is stored to outlier dataset 526, and processing continue in operation 618.

In operation 618, a determination is made concerning whether or not dataset 524 includes another observation or another observation vector has been received. When there is another observation, processing continues in an operation 620. When there is not another observation, processing continues in an operation 622.

In operation 620, a next observation is selected as observation vector z from dataset 524 or is received, and processing continues in operation 612 to determine if the next observation is an outlier.

In operation 622, scoring results are output. For example, statistical results associated with the scoring may be stored on one or more devices and/or on second computer-readable medium 508 in a variety of formats as understood by a person of skill in the art. Outlier dataset 526 and/or the scoring results further may be output to a second display 516, to a second printer 520, etc. In an illustrative embodiment, an alert message may be sent to another device using second communication interface 506, printed on second printer 520 or another printer, presented visually on second display 516 or another display, presented audibly using a second speaker 518 or another speaker when an outlier is identified.

Figure 7:
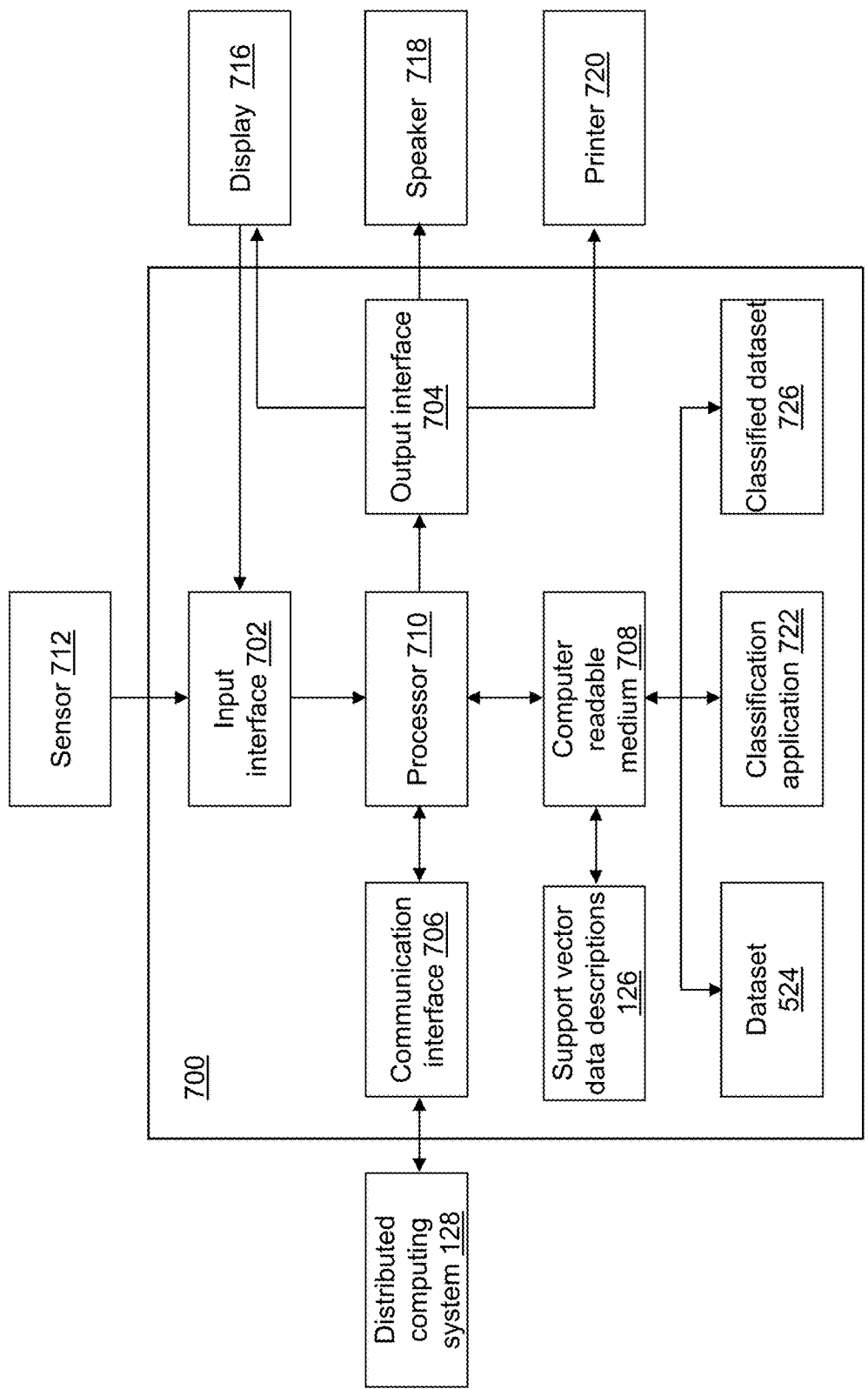
FIG. 7 depicts a block diagram of a classification device in accordance with an illustrative embodiment.

Referring to FIG. 7, a block diagram of a classification device 700 is shown in accordance with an illustrative embodiment. Classification device 700 may include a third input interface 702, a third output interface 704, a third communication interface 706, a third non-transitory computer-readable medium 708, a third processor 710, a classification application 722, SVDD 126, dataset 524, and a classified dataset 726. Fewer, different, and/or additional components may be incorporated into classification device 700. Classification device 700, outlier detection device 500, and/or SVDD training device 100 may be the same or different devices.

Third input interface 702 provides the same or similar functionality as that described with reference to input interface 102 of SVDD training device 100 though referring to classification device 700. Third output interface 704 provides the same or similar functionality as that described with reference to output interface 104 of SVDD training device 100 though referring to classification device 700. Third communication interface 706 provides the same or similar functionality as that described with reference to communication interface 106 of SVDD training device 100 though referring to classification device 700. Data and messages may be transferred between classification device 700 and distributed computing system 128 using third communication interface 706. Third computer-readable medium 708 provides the same or similar functionality as that described with reference to computer-readable medium 108 of SVDD training device 100 though referring to classification device 700. Third processor 710 provides the same or similar functionality as that described with reference to processor 110 of SVDD training device 100 though referring to classification device 700.

Classification application 722 performs operations associated with creating classified dataset 726 from data stored in dataset 524 using SVDD 126. SVDD 126 may be used to classify data stored in dataset 524 to support various data analysis functions as well as provide alert/messaging related to the classified data stored in classified dataset 726. Dependent on the type of data stored in training dataset 124 and dataset 524, classified dataset 726 may be used for image classification, for intrusion detection, for fraud detection, etc. Some or all of the operations described herein may be embodied in classification application 722. The operations may be implemented using hardware, firmware, software, or any combination of these methods.

Referring to the example embodiment of FIG. 7, classification application 722 is implemented in software (comprised of computer-readable and/or computer-executable instructions) stored in third computer-readable medium 708 and accessible by third processor 710 for execution of the instructions that embody the operations of classification application 722. Classification application 722 may be written using one or more programming languages, assembly languages, scripting languages, etc. Classification application 722 may be integrated with other analytic tools. For example, classification application 722 may be part of SAS® Enterprise Miner™ and/or SAS® Viya™ developed and provided by SAS Institute Inc. of Cary, N.C. Classification application 722 further may be incorporated into SAS® Event Stream Processing.

Classification application 722 may be implemented as a Web application. Classification application 722 may be integrated with other system processing tools to automatically process data generated as part of operation of an enterprise, to classify data, and/or to provide a warning or alert associated with a classification using third input interface 702, third output interface 704, and/or third communication interface 706 so that appropriate action can be initiated in response to the classification. Classification application 722, outlier identification application 522, and/or training application 122 further may be integrated applications.

Figure 8:
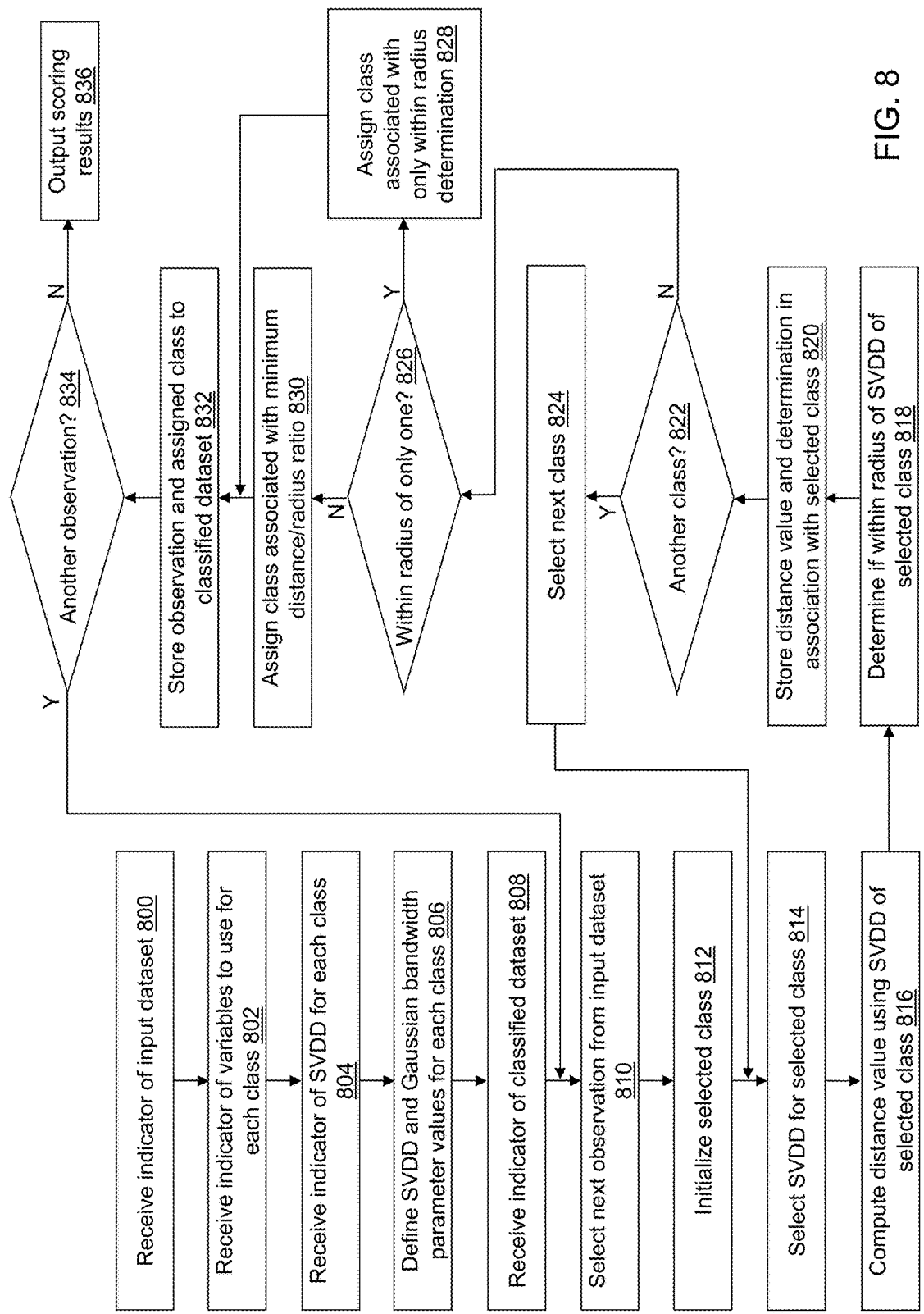
FIG. 8 depicts a flow diagram illustrating examples of operations performed by the classification device of FIG. 7 in accordance with an illustrative embodiment.

Referring to FIG. 8, example operations of classification application 722 to use SVDD 126 to classify dataset 524 and to create classified dataset 726 are described. Additional, fewer, or different operations may be performed depending on the embodiment of classification application 722. The order of presentation of the operations of FIG. 8 is not intended to be limiting. Although some of the operational flows are presented in sequence, the various operations may be performed in various repetitions, concurrently (in parallel, for example, using threads and/or a distributed computing system), and/or in other orders than those that are illustrated.

Similar to operation 600, in an operation 800, the ninth indicator is received that indicates dataset 524.

Similar to operation 602, in an operation 802, the tenth indicator may be received that indicates a plurality of variables of dataset 524 to define observation vector z.

Similar to operation 604, in an operation 804, an eleventh indicator is received that indicates SVDD 126 though the eleventh indicator includes SVDD 126 for each class indicated in operation 401. For example, the eleventh indicator indicates a location and a name of SVDD 126, which stores the $SVDD_m$ for each class m=1, 2, . . . , M with an indicator that indicates the associated class such as index m or a class name or other class descriptor. As another example, the eleventh indicator indicates a location and a name of SVDD 126 for each class.

Similar to operation 606, in an operation 806, the set of support vectors SV, the Lagrange constants $\alpha_i$ for each support vector of the set of support vectors SV, the center position a, $R^2$, and the Gaussian bandwidth parameter s are defined for each class. For example, the set of support vectors SV, the set of boundary support vectors BV, the Lagrange constants $\alpha_i$ for each support vector of the set of support vectors SV, the center position a, $R^2$, and/or the Gaussian bandwidth parameters are read from SVDD 126 for each class though the center position a and $R^2$ may be computed from the set of support vectors SV or the set of boundary support vectors BV and the associated Lagrange constants $\alpha_i$ for each class instead.

Similar to operation 608, in an operation 808, the twelfth indicator is received that indicates classified dataset 726.

Similar to operation 610, in an operation 810, a first observation is read from dataset 524 and selected as observation vector z.

In an operation 812, a selected class is initialized for the number of classes M. For example, an index m may be initialized to one.

In an operation 814, the SVDD 126 for the selected class $SVDD_m$ is selected. For example, the set of support vectors $SV_m$, the Lagrange constants $\alpha_{im}$ for each support vector of the set of support vectors $SV_m$, the center position $a_m$, $R_m^2$, and the Gaussian bandwidth parameter $s_m$ are defined for the class indicated using index m.

Similar to operation 612, in an operation 816, a distance value for observation vector z is computed using $dist_n(z) = K(z,z) - 2\sum_{i=1}^{N_{SV}} \alpha_{im} K(x_i, z) + \sum_{i=1}^{N_{SV}} \sum_{j=1}^{N_{SV}} \alpha_{im} \alpha_{jm} K(x_i, x_j)$, where K(.,.) is the Gaussian kernel function defined as:

$$K(x_i, x_j) = \exp\frac{-\|x_i - x_j\|^2}{2s_m^2}$$

where $x_i$ is any support vector of the defined set of support vectors $SV_m$, $N_{SV}$ is the number of support vectors included in the defined set of support vectors $SV_m$, and $\alpha_{im}$ is the Lagrange constant associated with support vector $x_i$. $G_m = \sum_{i=1}^{N_{SV}} \sum_{j=1}^{N_{SV}} \alpha_{im} \alpha_{jm} K(x_i, x_j)$ may have been computed from the defined set of support vectors $SV_m$ and the Lagrange constants $\alpha_{im}$ for each support vector of the set of support vectors $SV_m$ and stored in SVDD 126 in operation 428 or may have been computed after operation 806 and before operation 816 to save computing resources and time. For a Gaussian kernel function, K(z,z)=1. Thus, computation of the distance value can be simplified to $dist^2(z) = 1 - 2\sum_{i=1}^{N_{SV}} \alpha_{im} K(x_i, z) + G_m$.

In an operation 818, a determination is made concerning whether or not $dist^2(z) > R_m^2$. When $dist^2(z) \le R_m^2$, the determination is that the observation vector z is within the radius of the selected class. When $dist^2(z) > R_m^2$, the determination is that the observation vector z is not within the radius of the selected class. For illustration, a flag may be used to indicate that the observation vector z is or is not within the radius of the selected class.

In an operation 820, the distance value $dist_m(z)$ and a flag value of the flag may be stored, for example, in one or more arrays indexed using index m. Of course, other data structures may be used such as lists to store the information for each class.

In an operation 822, a determination is made concerning whether or not there is another class of the number of classes M to process. When there is another class, processing continues in operation 824 to select the next class. When there is not another class, processing continues in an operation 826.

In operation 824, a next class is selected of the number of classes M, and processing continues in operation 814. For example, the index m may be incremented.

In an operation 826, a determination is made concerning whether or not the observation vector z was within the radius of only a single class of the M classes. When the observation vector z was within the radius of only a single class of the M classes, processing continues in an operation 828. When the observation vector z was not within the radius of only a single class of the M classes, processing continues in an operation 830. For example, if an array is used to store the flag values for each class of the M classes, a test is used to determine if there is only one flag value set to indicate the observation vector z was within the radius.

In operation 828, the single class of the M classes for which the observation vector z was within its radius is assigned as the classification for the observation vector z. For example, the index m associated with the single class is used to define the classification, for example, by indexing into an array that further defines the classification alphanumerically such as using a class name or other class descriptor. For example, if the classes are types of terrain/vegetation detectable in image data, an array may store a description of each type of terrain that is indexed using the index m. The description may be associated with the data filter indicated in operation 404 to create SVDD 126 for the single class. As used herein, assigning a class or a class indicator is also known as labeling the observation vector z.

Figures 9, 10:
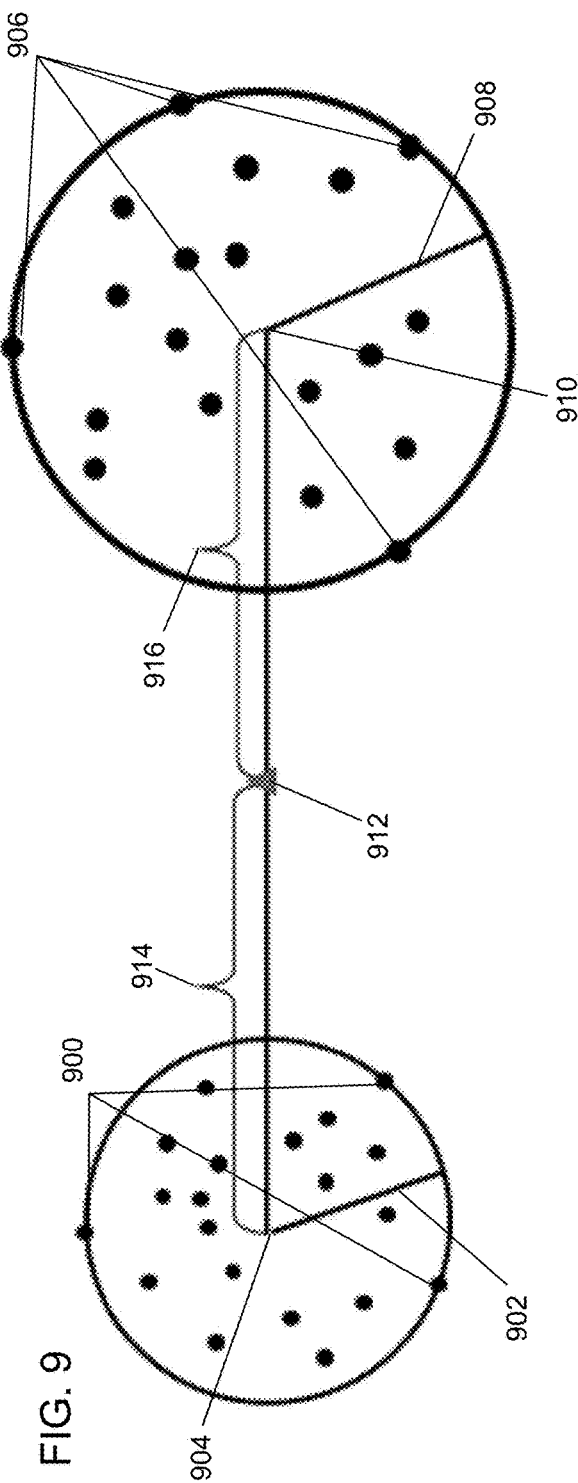
FIG. 9 illustrates a distance/radius ratio computation in accordance with an illustrative embodiment.
FIG. 10 provides a table that summarizes three test datasets in accordance with an illustrative embodiment.

In operation 830, the class for the observation vector z is assigned using $$\arg\left\{\min_{m=1,2,\ldots,M} (dist_m(z)/R_m)\right\},$$

which is illustrated in FIG. 9 for two classes. A first class $SVDD_1$ is represented by first boundary vectors $BV_1$ 900, a first radius $R_1$ 902, a first center position $a_1$ 904 with dots within first radius $R_1$ 902 representing first support vectors $SV_1$. A second class $SVDD_2$ is represented by second boundary vectors $BV_2$ 906, a second radius $R_2$ 908, a second center position $a_2$ 910 with dots within second radius $R_2$ 908 representing second support vectors $SV_2$. A location of the observation vector z is indicated by an icon 912. A first distance $dist_1(z)$ 914 is shown between first center position $a_1$ 904 and icon 912 that represents the location of the observation vector z. A second distance $dist_2(z)$ 916 is shown between second center position $a_2$ 910 and icon 912 that represents the location of the observation vector z. In this illustration, first distance $dist_1(z)$ 914 is equal to second distance $dist_2(z)$ 916. Because first radius $R_1$ 902 is less than second radius $R_2$ 908, the distance relative to the hypersphere radius of the first class SVDD, is greater so the second class is assigned to the observation vector z.

Referring again to FIG. 8, in operation 832, the observation vector z and/or an indicator of observation vector z and the assigned class and/or an indicator of the assigned class are stored to classified dataset 726, and processing continues in operation 618.

Similar to operation 618, in an operation 834, a determination is made concerning whether or not dataset 524 includes another observation or another observation vector has been received. When there is another observation, processing continues in operation 810. When there is not another observation, processing continues in an operation 836.

In operation 836, scoring results are output. For example, statistical results associated with the classification may be stored on one or more devices and/or on third computer-readable medium 708 in a variety of formats as understood by a person of skill in the art. Classified dataset 726 and/or the scoring results further may be output to a third display 716, to a third printer 720, etc. In an illustrative embodiment, an alert message may be sent to another device using third communication interface 706, printed on third printer 720 or another printer, presented visually on third display 716 or another display, presented audibly using a third speaker 718 or another speaker when one or more classed are identified.

Use of training application 122, which does not depend on labeled data that separates the inliers from the outliers and that does not depend on a user specification of the tolerance value δ, was compared to three existing methods in classifying image data as an example field-of-use. In the comparisons described below, the mean pairwise distance D computation described in operations 416 and 418 with the computed value for the tolerance value δ for each class was used for training application 122.

A second method is designated a VAR criterion method and is described in the paper by Khazai. The VAR criterion method computes the Gaussian bandwidth parameter B using $s=(\Sigma_{j=i}^{P}\sigma_j^2)^{0.5}$, where $\sigma_j^2$ is a variance of a $j^{th}$ variable of dataset 524.

A third method is described in the parent application of the present application, U.S. patent application Ser. No. 15/887,037, titled BANDWIDTH SELECTION IN SUPPORT VECTOR DATA DESCRIPTION FOR OUTLIER IDENTIFICATION and uses the mean pairwise distance $\overline{D}$ computation described in operations 416 and 418 with a predefined value for the tolerance value δ. The third method is referred to herein as a Mean criterion method.

A fourth method is described U.S. Patent Publication No. 2017/0236074, titled KERNEL PARAMETER SELECTION IN SUPPORT VECTOR DATA DESCRIPTION FOR OUTLIER IDENTIFICATION, and assigned to SAS Institute Inc., the assignee of the present application. The fourth method is referred to herein as a Peak criterion method.

The classification performance comparisons between the four methods for computing the Gaussian bandwidth parameter s were generated using three hyperspectral datasets as training dataset 124 and dataset 524. The three hyperspectral datasets are summarized in a dataset table 1000 shown in FIG. 10. Class table 1100 shown in FIG. 11 summarizes the classes included in each of the three hyperspectral datasets. Class table 1100 lists the classes with a class number that can be used as index m, a class name, and a number of ground truth samples of each class included in the associated dataset. For example, a Botswana dataset included 14 classes, a Kennedy Space Center (KSC) data set included 13 classes, and an Indian Pines dataset included 16 classes.

The evaluation process consisted of three steps: data training, data testing, and performance evaluation. The following data preprocessing steps were applied before the SVDD was determined using each of the four methods: 1) a preprocessing step was applied to the KSC data set to correct pixels with saturated data values by substituting a zero for data values greater than 65,500, and 2) each dataset was normalized with a maximum data value in the dataset making the data range always between zero and one.

For each class, an SVDD classifier was trained by using 30% of the available samples, randomly selected. The remaining 70% were reserved for testing. Assuming that there are M classes, each test sample was evaluated against each trained class as described in operations 814 to 830 to assign a class (label) to each test sample. For each dataset, the training and testing experiments were performed five times, each with a different randomly selected subset (30%) for training and the rest (70%) for testing. The classification performance was evaluated using the overall accuracy, which is defined as a percentage of pixels that are correctly labeled. FIGS. 12 to 15 include the results for each experiment as a row labeled Exp1 through Exp5, with a last row showing an average accuracy from the five experiments.

Figure 13:
FIG. 13 provides a table that lists a performance from five different experiments using four different methods for a second dataset of the three test datasets in accordance with an illustrative embodiment.

Referring to FIG. 12, a Botswana table 1200 presents the results for the Botswana dataset for each of the four methods. Referring to FIG. 13, a raw KSC table 1300 presents the results for the KSC dataset without the preprocessing step for each of the four methods. Referring to FIG. 14, a preprocessed KSC table 1400 presents the results for the KSC dataset with the preprocessing step for each of the four methods. Referring to FIG. 15, an Indian Pines table 1500 presents the results for the Indian Pines dataset for each of the four methods.

Based on a comparison between raw KSC table 1300 and preprocessed KSC table 1400, the preprocessing step significantly improved the data classification performance. The classification performance results demonstrate that training application 122 with the computed tolerance value δ performed uniformly better than other Gaussian bandwidth selection methods for the Botswana dataset, the preprocessed KSC dataset, and the Indiana Pine dataset. Because training application 122 provides a closed-form formula for the Gaussian bandwidth selection, its time-efficiency is equivalent to that of the VAR and Mean criterion methods. Therefore, training application 122 provides performance and speed improvements relative to existing hyperspectral image data processing methods.

Of the three hyperspectral test data sets, the Indian Pines set has the lowest overall accuracy. The classification performance was further analyzed by computing the accuracy of each class using training application 122 to compute the SVDD. The results are shown referring to FIG. 16 that includes an Indian Pines class accuracy table 1600. Indian Pines class accuracy table 1600 includes a first column 1602, a second column 1604, a third column 1606, a fourth column 1608, a fifth column 1610, a sixth column 1612, a seventh column 1614, an eighth column 1616, and a ninth column 1618. First column 1602 shows the class number. Second column 1604 shows the class name. Third column 1606 shows the number of samples. Fourth column 1608 shows the accuracy computed for the first experiment. Fifth column 1610 shows the accuracy computed for the second experiment. Sixth column 1612 shows the accuracy computed for the third experiment. Seventh column 1614 shows the accuracy computed for the fourth experiment. Eighth column 1616 shows the accuracy computed for the fifth experiment. Ninth column 1618 shows the average accuracy computed for all five experiments.

For classes that included very few labeled samples (Alfalfa, Grass-pasture-mowed, and Oats), there were only 10 to 15 training samples per class, which is not enough to characterize the class, and the trained classifier was not able to identify test samples well. The second type of difficulty occurred for classes that were very similar to each other (for example, Corn-mintill which is very similar to Corn and Soybean-notill which is very similar to Soybean-mintill and to Soybean-clean). Given the similar spectral radiance of these materials, misclassification was significant between these classes, and thus resulted in a lower overall accuracy.

Computation of the Gaussian bandwidth parameters using training application 122 is extremely fast even when training dataset 124 is very large because it can be computed in a single iteration. Computation of the Gaussian bandwidth parameters using training application 122 is further automatic and unsupervised. For example, the Botswana dataset was executed with each of the four methods 50 times. 50-100 training observations were included in each of the 14 classes resulting in each observation having a dimension of 145. An average execution time for the 50 executions and for all of the 14 classes using the peak criterion method was 8151.711 seconds. An average execution time for the 50 executions and for all of the 14 classes using the VAR criterion method was 0.0119 seconds. An average execution time for the 50 executions and for all of the 14 classes using the mean criterion method was 0.0147 seconds. An average execution time for the 50 executions and for all of the 14 classes using training application 122 was 0.0176 seconds. Thus, training application 122 provides comparable accuracy to the peak criterion method while executing over 463,000 times faster on average. Additionally, training application 122 provides significantly better accuracy than using the VAR criterion method and the mean criterion method with almost identical execution time.

Figure 17:
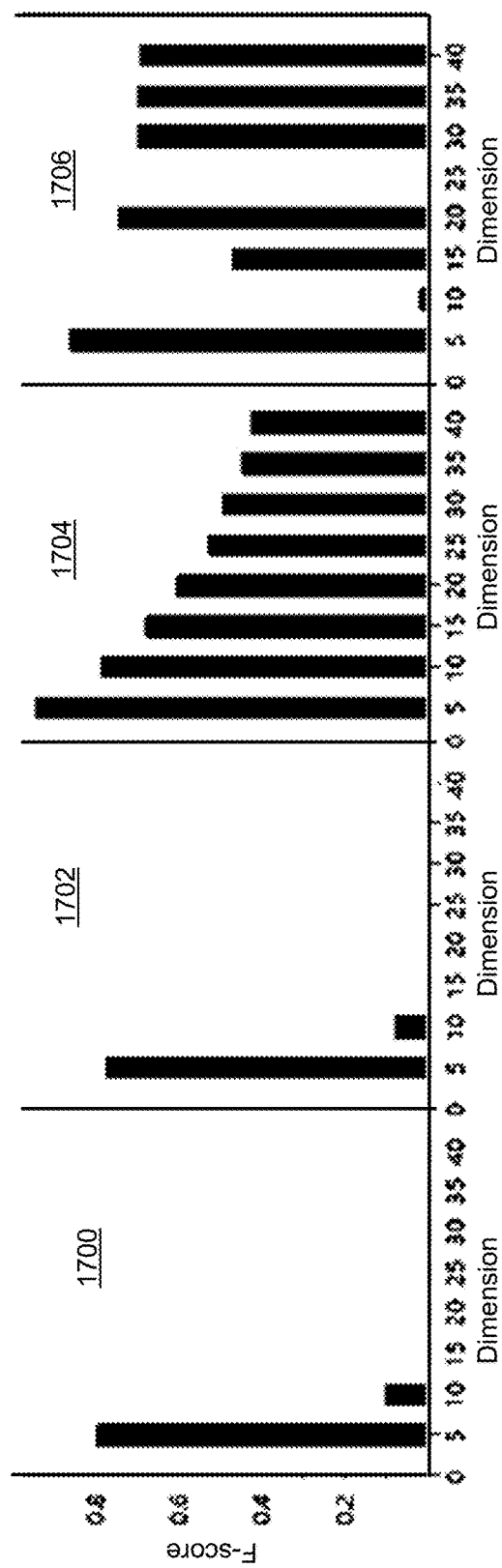
FIG. 17 provides a graph that compares an F-score as a function of a number of dimensions computed using the four different methods for a fourth dataset in accordance with an illustrative embodiment.

For additional comparison, referring to FIG. 17, a first bar chart 1700, a second bar chart 1702, a third bar chart 1704, and a fourth bar chart 1706 show a comparison of an F-score as a function of a number of dimensions computed using four different methods with a training dataset in accordance with an illustrative embodiment. Each training dataset had 5,000 uniformly distributed random observations with dimensions ranging from 5 to 40. For each training dataset, a scoring dataset was created with 10,000 observations and the same number of dimensions as the training dataset. 50% of the scoring observations were uniformly random and labeled as normal observations. The remaining 50% were labeled as outliers. Two of the variables for each outlier observation were equal to 1+0.25*rand where rand is a uniformly distributed random number, and the remaining variables for each outlier observation were uniformly distributed random numbers.

The F-score ($F_1$ score or an F-measure) was computed using the equation $$F\text{-}score = 2 * \frac{precision * sensitivity}{precision + sensitivity}$$

where the precision was computed using the equation TP/(TP+FP), and the sensitivity (also called recall, the true positive rate, or the probability of detection) was computed using the equation TP/(TP+FN), where TP is a number of true positive determinations, FP is a number of false positive determinations, and FN is a number of false negative determinations.

The first bar chart 1700 depicts the F-score computed using the mean criterion method. The second bar chart 1702 depicts the F-score computed using a median criterion method, which uses the median pairwise distance $D_{md}$ computation described in operations 416 and 418 with a predefined value for the tolerance value δ.

The third bar chart 1704 depicts the F-score computed using training application 122. The fourth bar chart 1706 depicts the F-score computed using the peak criterion method. The results show that training application 122 provides a significantly better F-score than the median criterion method and the mean criterion method. Training application 122 also provides a better F-score for low dimensions (<20 dimensions) compared to the peak criterion method. Bad tuning parameters caused the peak criterion method to underperform for dimensions 10 and 25. An advantage of training application 122 is that training application 122 does not require such tuning parameters.

Figure 18:
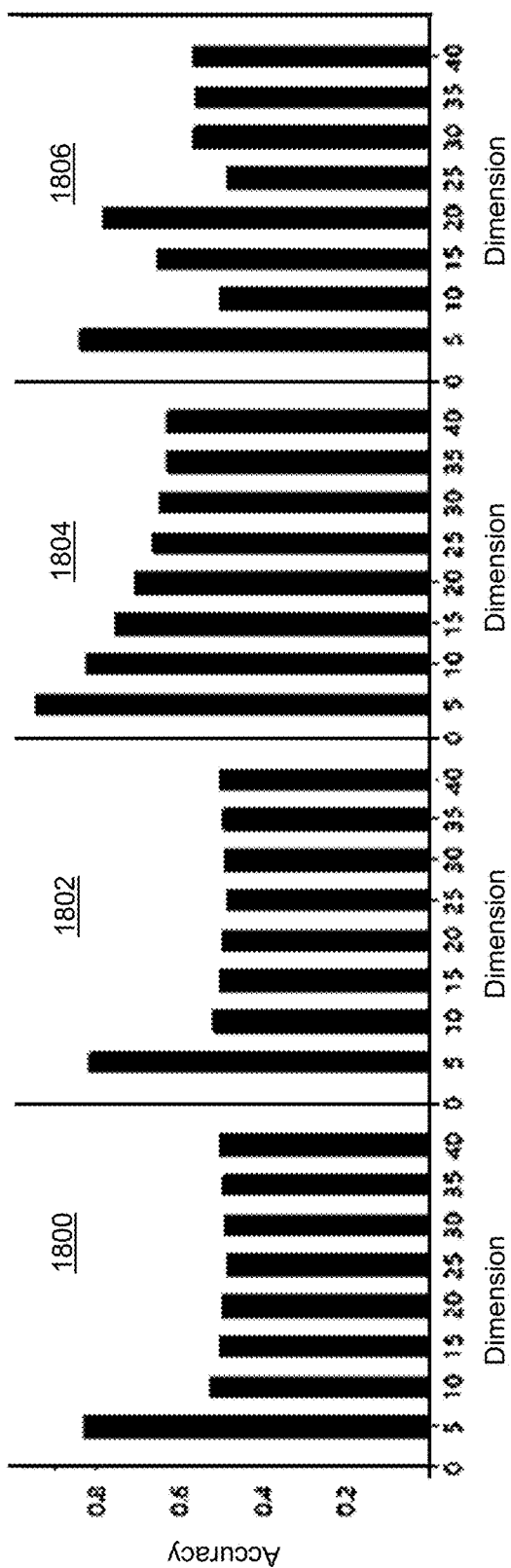
FIG. 18 provides a graph that compares an accuracy as a function of the number of dimensions computed using the four different methods for the fourth dataset in accordance with an illustrative embodiment.

For additional comparison, referring to FIG. 18, a first bar chart 1800, a second bar chart 1802, a third bar chart 1804, and a fourth bar chart 1806 show a comparison of an accuracy as a function of the number of dimensions computed using the four different methods with the fourth dataset in accordance with an illustrative embodiment. The accuracy is defined as a proportion of the total number of predictions that are correct and can be computed using the equation (TP+TN)/(TP+TN+FP+FN), where TN is a number of true negative determinations.

The first bar chart 1800 depicts the accuracy computed using the mean criterion method. The second bar chart 1802 depicts the accuracy computed using the median criterion method. The third bar chart 1804 depicts the accuracy computed using training application 122. The fourth bar chart 1806 depicts the accuracy computed using the peak criterion method. The results show that training application 122 provides a significantly better accuracy than the median criterion method and the mean criterion method. Training application 122 also provides a better accuracy for low dimensions (<20 dimensions) compared to the peak criterion method. Again, bad tuning parameters caused the peak criterion method to underperform for dimensions 10, 15, and 25.

Figure 19:
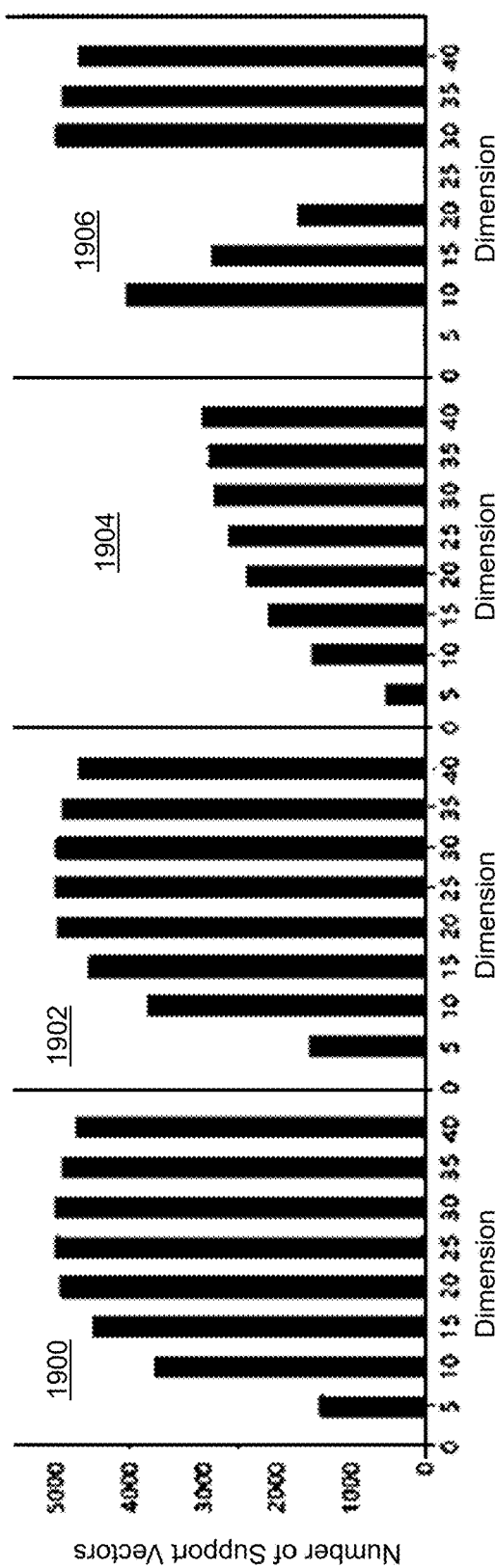
FIG. 19 provides a graph that compares a number of support vectors as a function of the number of dimensions determined using the four different methods for the fourth dataset in accordance with an illustrative embodiment.

For additional comparison, referring to FIG. 19, a first bar chart 1900, a second bar chart 1902, a third bar chart 1904, and a fourth bar chart 1906 show a comparison of the number of support vectors $N_{SV}$ as a function of the number of dimensions computed using the four different methods with the fourth dataset in accordance with an illustrative embodiment.

The first bar chart 1900 depicts the $N_{SV}$ computed using the mean criterion method. The second bar chart 1902 depicts the $N_{SV}$ computed using the median criterion method. The third bar chart 1904 depicts the $N_{SV}$ computed using training application 122. The fourth bar chart 1906 depicts the $N_{SV}$ computed using the peak criterion method. The results show that training application 122 selects significantly fewer support vectors than the median criterion method or the mean criterion method. Training application 122 also typically selects fewer support vectors than the peak criterion method. Fewer support vectors results in less time to compute a test observation's distance to the hyper-sphere center making the classification process faster.

Figure 20:
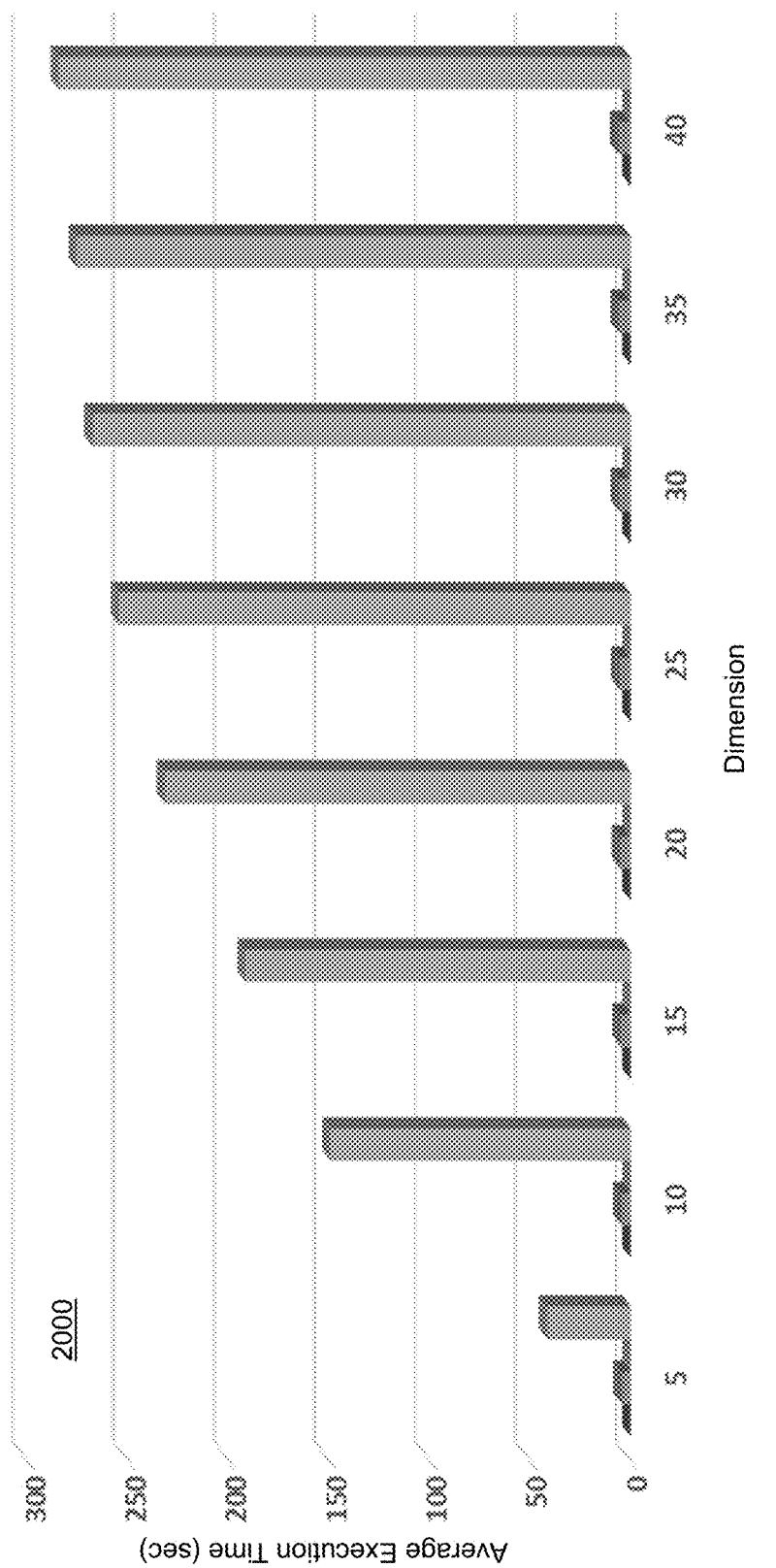
FIG. 20 provides a graph that compares an average computer execution time as a function of the number of dimensions using the four different methods for the fourth dataset in accordance with an illustrative embodiment.

For additional comparison, referring to FIG. 20, an execution time bar chart 2000 shows a comparison of an executime as a function of the number of dimensions using the four different methods with the fourth dataset in accordance with an illustrative embodiment. For example, the fourth dataset was executed with each of the four methods 50 times with 5,000 training observations and the identified number of dimensions. For each dimension [5, 10, 15, 20, 25, 30, 35, 40], the average execution time using the mean criterion method is the far left bar chart, the average execution time using the median criterion method is the center left bar chart, the average execution time using training application 122 is the center right bar chart, and the average execution time using the peak criterion method is the far right bar chart. Table I below also summarizes the average execution time results in seconds.

TABLE I

| Dimension | Mean | Median | Training application 122 | Peak |
|---|---|---|---|---|
| 5 | 0.038 | 4.470 | 0.076 | 41.384 |
| 10 | 0.034 | 4.665 | 0.070 | 149.251 |
| 15 | 0.036 | 4.942 | 0.076 | 191.585 |
| 20 | 0.053 | 5.159 | 0.082 | 232.010 |
| 25 | 0.057 | 5.413 | 0.088 | 254.477 |
| 30 | 0.059 | 5.579 | 0.089 | 267.711 |
| 35 | 0.059 | 5.988 | 0.094 | 275.368 |
| 40 | 0.064 | 6.174 | 0.094 | 284.545 |

Again, training application 122 provides comparable or sometimes better F-score and accuracy with fewer support vectors in comparison to the peak criterion method while executing thousands of times faster on average. Additionally, training application 122 provides significantly better accuracy than using the median criterion method and the mean criterion method with a similar or faster execution time.

Training application 122 can be implemented as a wrapper code around a core module for SVDD training computations either in a single machine or in a multi-machine distributed environment. There are applications for training application 122, outlier identification application 522, and classification application 722 in areas such as process control and equipment health monitoring where the size of training dataset 124 can be very large, consisting of a few million observations. Training dataset 124 may include sensor readings measuring multiple key health or process parameters at a very high frequency. For example, a typical airplane currently has ~7,000 sensors measuring critical health parameters and creates 2.5 terabytes of data per day. By 2020, this number is expected to triple or quadruple to over 7.5 terabytes. In such applications, multiple SVDD training models may be developed with each representing a different operating mode of the equipment or different process settings. Successful application of an SVDD in these types of applications requires algorithms that can train using huge amounts of training data in an efficient manner, which is provided by training application 122.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    (a) compute a mean pairwise distance value between a plurality of observation vectors, wherein each observation vector of the plurality of observation vectors includes a variable value for each variable of a plurality of variables;
    (b) compute a tolerance value based on a number of the plurality of observation vectors;
    (c) compute a scaling factor value based on the number of the plurality of observation vectors and the computed tolerance value;
    (d) compute a Gaussian bandwidth parameter value by multiplying the computed mean pairwise distance value and the computed scaling factor value;
    (e) train a support vector data description (SVDD) model using the plurality of observation vectors by computing an optimal value of an objective function that includes a Gaussian kernel function that uses the computed Gaussian bandwidth parameter value, wherein the objective function associated with the optimal value defines a set of support vectors selected from the plurality of observation vectors to define a boundary around the plurality of observation vectors; and
    (f) output the computed Gaussian bandwidth parameter value and the trained SVDD model for determining if a new observation vector is an outlier or for classifying the new observation vector.

2. The non-transitory computer-readable medium of claim 1, wherein the mean pairwise distance value is computed using $$\overline{D}^2 = \frac{2N}{(N-1)} \sum_{j=1}^{p} \sigma_j^2,$$

where $\overline{D}$ is the mean pairwise distance value, N is the number of the plurality of observation vectors, p is a number of the plurality of variables, and $\sigma_j^2$ is a variance of each variable of the plurality of variables.

3. The non-transitory computer-readable medium of claim 2, wherein the variance for a first variable of the plurality of variables is computed using $$\sigma_1^2 = \frac{\sum_{i=1}^{N} (x_{i1} - \mu_1)^2}{N},$$

where $x_{i1}$ is a value for the first variable of the ith observation vector of the plurality of observation vectors and $$\mu_1 = \frac{\sum_{i=1}^{N} x_{i1}}{N}.$$

4. The non-transitory computer-readable medium of claim 2, wherein the Gaussian bandwidth parameter value is computed using s=$\overline{D}$F, where s is the Gaussian bandwidth parameter value and F is the scaling factor value.

5. The non-transitory computer-readable medium of claim 4, wherein the scaling factor value is computed using F=1/$\sqrt{\ln[(N-1)/\delta^2]}$, where $\delta$ is the computed tolerance value.

6. The non-transitory computer-readable medium of claim 1, wherein the scaling factor value is computed using F=1/$\sqrt{\ln[(N-1)/\delta^2]}$, where F is the scaling factor value, N is the number of the plurality of observation vectors, and $\delta$ is the computed tolerance value.

7. The non-transitory computer-readable medium of claim 1, wherein the tolerance value is computed by iteratively solving $\delta=[\ln(N-1)-2\ln(\delta)]^{-1.5}$ for $\delta$, where N is the number of the plurality of observation vectors, and $\delta$ is the computed tolerance value.

8. The non-transitory computer-readable medium of claim 7, wherein the computer-readable instructions further cause the computing device to iteratively solve for $\delta$ by:
  initializing a current tolerance value $\delta_0$;
  initializing a counter n=0;
  (g) computing a next tolerance value using $\delta_{n+1}=[\ln(N-1)-2\ln(\delta_n)]^{-1.5}$, where $\delta_{n+1}$ is the next tolerance value and $\delta_n$ is the current tolerance value;
  (h) computing an absolute value of a difference between the next tolerance value $\delta_{n+1}$ and the current tolerance value $\delta_n$;
  incrementing the counter n to replace the current tolerance value $\delta_n$ with the next tolerance value $\delta_{n+1}$ and repeating (g) and (h) until the computed absolute value satisfies a convergence test; and
  when the computed absolute value satisfies the convergence test, defining the computed tolerance value as the next tolerance value $\delta_{n+1}$.

9. The non-transitory computer-readable medium of claim 8, wherein the computed absolute value satisfies the convergence test when the computed absolute value is less than or equal to a predefined convergence value.

10. The non-transitory computer-readable medium of claim 1, wherein the tolerance value is computed by fitting a polynomial function to $\delta$ that has a degree greater than one as a function of $1/\ln(N-1)$, where N is the number of the plurality of observation vectors, and $\delta$ is the computed tolerance value.

11. The non-transitory computer-readable medium of claim 1, wherein the tolerance value is computed using a polynomial function $\delta=-0.14818008\phi^4+0.284623624\phi^3-0.252853808\phi^2+0.159059498\phi-0.001381145$, where $\phi=1/\ln(N-1)$, where N is the number of the plurality of observation vectors, and $\delta$ is the computed tolerance value.

12. The non-transitory computer-readable medium of claim 1, wherein the scaling factor value is computed using F=W/$\sqrt{Q \times \ln[2Q/(\delta^2 M)]}$, where F is the scaling factor value, W=$\sum_{i=1}^{N} w_i$, M=$\sum_{i=1}^{N} w_i^2$, Q=$(W^2-M)/2$, N is a number of distinct observation vectors included in the plurality of observation vectors, $\delta$ is the computed tolerance value, and $w_i$ is a repetition vector that indicates a number of times each observation vector of the distinct observation vectors is repeated.

13. The non-transitory computer-readable medium of claim 12, wherein the mean pairwise distance value is computed using $\sigma^2=\sum_{i=1}^{P} \sigma_i^2$, where $\sigma$ is the mean pairwise distance value, p is a number of the plurality of variables, and $\sigma_i^2$ is a weighted variance of each variable of the plurality of variables.

14. The non-transitory computer-readable medium of claim 13, wherein the weighted variance for a first variable of the plurality of variables is computed using $$\sigma_1^2 = \frac{\sum_{i=1}^{N} w_i(x_{i1}-\mu_1)^2}{W},$$

where $x_{i1}$ is a value for the first variable of the ith observation vector of the distinct observation vectors and $$\mu_1 = \frac{\sum_{i=1}^{N} w_i x_{i1}}{W}.$$

15. The non-transitory computer-readable medium of claim 13, wherein the Gaussian bandwidth parameter value is computed using s=$\sigma$F, where s is the Gaussian bandwidth parameter value.

16. The non-transitory computer-readable medium of claim 1, wherein the objective function defined for the SVDD model is max($\sum_{i=1}^{N}\alpha_i K(x_i, x_i)-\sum_{i=1}^{N}\sum_{j=1}^{N}\alpha_i\alpha_j K(x_i,x_j)$), subject to $\sum_{i=1}^{N}\alpha_i=1$ and $0\leq\alpha_i\leq C$, $\forall i=1, \ldots, N$, where $$K(x_i, x_j) = \exp\frac{-\|x_i - x_j\|^2}{2s^2}$$

is the Gaussian kernel function, s is the Gaussian bandwidth parameter value, N is the number of the plurality of observation vectors, C=1/Nf, where f is an expected outlier fraction, $x_i$ and $x_j$ are the plurality of observation vectors, and $\alpha_i$ and $\alpha_j$ are Lagrange constants.

17. The non-transitory computer-readable medium of claim 16, wherein the $x_i$ that have $0\leq\alpha_i<C$ are the defined set of support vectors.

18. The non-transitory computer-readable medium of claim 1, wherein, after (f), the computer-readable instructions further cause the computing device to:
  receive the new observation vector;
  compute a distance value using the trained SVDD model and the received new observation vector; and
  when the computed distance value is greater than a computed threshold, identify the received new observation vector as an outlier.

19. The non-transitory computer-readable medium of claim 18, wherein the defined set of support vectors are included in the trained SVDD model, wherein the threshold is computed using $R^2=1-2\sum_{i=1}^{N_{SV}}\alpha_i K(x_i, x_k)+\sum_{i=1}^{N_{SV}}\sum_{j=1}^{N_{SV}}\alpha_i\alpha_j K(x_i, x_j)$, where $R^2$ is the computed threshold, $x_k$ is any support vector of the defined set of support vectors, $$K(x_i, x_j) = \exp\frac{-\|x_i - x_j\|^2}{2s^2}$$

is the Gaussian kernel function, s is the computed Gaussian bandwidth parameter value, $N_{SV}$ is a number of support vectors included in the defined set of support vectors, $x_i$ and $x_j$ are each support vectors of the defined set of support vectors, and $\alpha_i$ and $\alpha_j$ are Lagrange constants of an associated support vector of the defined set of support vectors.

20. The non-transitory computer-readable medium of claim 19, wherein the Lagrange constant for each support vector included in the defined set of support vectors and the computed threshold are included in the trained SVDD model.

21. The non-transitory computer-readable medium of claim 19, wherein the distance value is computed using $dist^2 = 1 - 2\Sigma_{i=1}^{N_{SV}} \alpha_i K(x_i, z) + \Sigma_{i=1}^{N_{SV}} \Sigma_{j=1}^{N_{SV}} \alpha_i \alpha_j K(x_i, x_j)$, where dist is the computed distance value, and z is the received new observation vector.

22. The non-transitory computer-readable medium of claim 18, wherein when the computed distance value is not greater than the computed threshold, the received new observation vector is not identified as an outlier.

23. The non-transitory computer-readable medium of claim 18, wherein each variable of the plurality of variables describes a characteristic of a physical object, and identifying the new observation vector as an outlier indicates the physical object is performing in an anomalous manner.

24. The non-transitory computer-readable medium of claim 1, wherein each observation vector of the plurality of observation vectors includes a class indicator variable, wherein (a) to (f) are performed on a subset of the plurality of observation vectors associated with a unique class indicator of the class indicator variable to train the SVDD model for the unique class indicator.

25. The non-transitory computer-readable medium of claim 24, wherein (a) to (f) are performed for a plurality of unique class indicators of the class indicator variable to define a plurality of classes and to train the SVDD model for each class of the plurality of classes.

26. The non-transitory computer-readable medium of claim 25, wherein, after (f) is performed for each class of the defined plurality of classes, the computer-readable instructions further cause the computing device to:
receive the new observation vector;
select a class from the defined plurality of classes;
(g) select the trained SVDD model for the unique class indicator associated with the selected class;
(h) compute a distance value using the selected, trained SVDD model and the received new observation vector;
(i) determine if the received new observation vector is within a radius of the selected, trained SVDD model using the computed distance value; and
(j) store an indicator of the determination and the computed distance value; and
repeat (g) to (j) with each remaining class of the defined plurality of classes as the selected class;
when the received new observation vector is determined to be in a single class of the defined plurality of classes based on the stored indicator, assign the received new observation vector to the single class; and
when the received new observation vector is determined to not be in a single class of the defined plurality of classes based on the stored indicator, assign the received new observation vector to a class using $$\arg\left\{\min_{m=1,2,\ldots,M} (dist_m(z)/R_m)\right\},$$

where z is the received new observation vector, M is a number of the plurality of classes, $dist_m(z)$ is the stored, computed distance value for class m, and $R_m$ is the radius of the selected, trained SVDD model for class m.

27. The non-transitory computer-readable medium of claim 26, wherein the distance value is computed using $dist_m^2(z) = 1 - 2\Sigma_{i=1}^{N_{SV}} \alpha_{im} K(x_i, z) + \Sigma_{i=1}^{N_{SV}} \Sigma_{j=1}^{N_{SV}} \alpha_{im} \alpha_{jm} K(x_i, x_j)$, where $$K(x_i, x_j) = \exp\frac{-\|x_i - x_j\|^2}{2s_m^2}$$

is the Gaussian kernel function, $s_m$ is the computed Gaussian bandwidth parameter value for class m, $N_{SV}$ is a number of support vectors included in the defined set of support vectors for class m, $x_i$ and $x_j$ are each support vectors of the defined set of support vectors for class m, and $\alpha_i$ and $\alpha_j$ are Lagrange constants of an associated support vector of the defined set of support vectors for class m.

28. A computing device comprising:
a processor; and
a non-transitory computer-readable medium operably coupled to the processor, the computer-readable medium having computer-readable instructions stored thereon that, when executed by the processor, cause the computing device to
compute a mean pairwise distance value between a plurality of observation vectors, wherein each observation vector of the plurality of observation vectors includes a variable value for each variable of a plurality of variables;
compute a tolerance value based on a number of the plurality of observation vectors;
compute a scaling factor value based on the number of the plurality of observation vectors and the computed tolerance value;
compute a Gaussian bandwidth parameter by multiplying using the computed mean pairwise distance value and the computed scaling factor value;
train a support vector data description (SVDD) model using the plurality of observation vectors by computing an optimal value of an objective function that includes a Gaussian kernel function that uses the computed Gaussian bandwidth parameter value, wherein the objective function associated with the optimal value defines a set of support vectors selected from the plurality of observation vectors to define a boundary around the plurality of observation vectors; and
output the computed Gaussian bandwidth parameter value and the defined a set of support vectors for determining if a new observation vector is an outlier or for classifying the new observation vector.

29. A method of determining a bandwidth parameter value for a support vector data description for outlier identification, the method comprising:
computing, by a computing device, a mean pairwise distance value between a plurality of observation vectors, wherein each observation vector of the plurality of observation vectors includes a variable value for each variable of a plurality of variables;
computing, by the computing device, a tolerance value based on a number of the plurality of observation vectors;

computing, by the computing device, a scaling factor value based on the number of the plurality of observation vectors and the computed tolerance value;

computing, by the computing device, a Gaussian bandwidth parameter value by multiplying the computed mean pairwise distance value and the computed scaling factor value;

training, by the computing device, a support vector data description (SVDD) model using the plurality of observation vectors by computing an optimal value of an objective function that includes a Gaussian kernel function that uses the computed Gaussian bandwidth parameter value, wherein the objective function associated with the optimal value defines a set of support vectors selected from the plurality of observation vectors to define a boundary around the plurality of observation vectors; and outputting, by the computing device, the computed Gaussian bandwidth parameter value and the defined a set of support vectors for determining if a new observation vector is an outlier or for classifying the new observation vector.

30. The method of claim 29, wherein the mean pairwise distance value is computed using $$\overline{D}^2 = \frac{2N}{(N-1)}\sum_{j=1}^{p} \sigma_j^2,$$

where $\overline{D}$ is the mean pairwise distance value, N is the number of the plurality of observation vectors, p is a number of the plurality of variables, and $\sigma_j^2$ is a variance of each variable of the plurality of variables.

* * * * *

UNITED STATES PATENT AND TRADEMARK OFFICE
CERTIFICATE OF CORRECTION

PATENT NO. : 10,482,353 B2  
APPLICATION NO. : 16/055336  
DATED : November 19, 2019  
INVENTOR(S) : Yuwei Liao et al.

Page 1 of 5

It is certified that error appears in the above-identified patent and that said Letters Patent is hereby corrected as shown below:

In the Specification

Column 6, Lines 18-21:
Delete the phrase "SAS/STATO, SAS® High Performance Analytics Server, SAS® LASR™' SAS® In-Database Products, SAS® Scalable Performance Data Engine, SAS/ORO, SAS/ETSO," and replace with --SAS/STAT®, SAS® High Performance Analytics Server, SAS® LASR™, SAS® In-Database Products, SAS® Scalable Performance Data Engine, SAS/OR®, SAS/ETS®,--.

Column 8, Line 35:
Delete the phrase "$\max(\sum_{i=1}^{n} \alpha_i(x_i \cdot x_i) - \sum_{i=1}^{n}\sum_{j=1}^{n} \alpha_i\alpha_j(x_i \cdot x_j))$," and replace with --$\max(\sum_{i=1}^{n} \alpha_i(x_i \cdot x_i) - \sum_{i=1}^{n}\sum_{j=1}^{n} \alpha_i\alpha_j(x_i \cdot x_j))$,--.

Column 8, Line 38:
Delete the phrase "$\sum_{i=1}^{n} \alpha_i = 1$," and replace with --$\sum_{i=1}^{n} \alpha_i = 1$,--.

Column 8, Line 54:
Delete the phrase "$\sum_{i=1}^{n} \alpha_i x_i = a$." and replace with --$\sum_{i=1}^{n} \alpha_i x_i = a.$--.

Column 9, Line 5:
Delete the phrase "$R^2 = x_k \cdot x_k - 2\sum_{i=1}^{N_{SV}} \alpha_i(x_i \cdot x_k) + \sum_{i=1}^{N_{SV}}\sum_{j=1}^{N_{SV}} \alpha_i\alpha_j(x_i \cdot x_j)$," and replace with --$R^2 = x_k \cdot x_k - 2\sum_{i=1}^{N_{SV}} \alpha_i(x_i \cdot x_k) + \sum_{i=1}^{N_{SV}}\sum_{j=1}^{N_{SV}} \alpha_i\alpha_j(x_i \cdot x_j)$--.

Signed and Sealed this  
Eleventh Day of February, 2020

Andrei Iancu  
*Director of the United States Patent and Trademark Office*

Column 9, Lines 12-13:

Delete the phrase "$dist^2(z) = (z \cdot z) - 2\sum_{i=1}^{N_{SV}} \alpha_i(x_i \cdot z) + \sum_{i=1}^{N_{SV}} \sum_{j=1}^{N_{SV}} \alpha_i \alpha_j(x_i \cdot x_j)$,"
and replace with -- $dist^2(z) = (z \cdot z) - 2\sum_{i=1}^{N_{SV}} \alpha_i(x_i \cdot z) + \sum_{i=1}^{N_{SV}} \sum_{j=1}^{N_{SV}} \alpha_i \alpha_j(x_i \cdot x_j)$ --.

Column 9, Line 48:

Delete the phrase "$\max(\sum_{i=1}^{n} \alpha_i K(x_i, x_i) \sum_{i=1}^{n} \sum_{j=1}^{n} \alpha_i \alpha_j K(x_i, x_j))$," and replace with -- $\max(\sum_{i=1}^{n} \alpha_i K(x_i, x_i) - \sum_{i=1}^{n} \sum_{j=1}^{n} \alpha_i \alpha_j K(x_i, x_j))$, --.

Column 9, Line 52:

Delete the phrase "$\sum_{i=1}^{n} \alpha_i = 1$," and replace with -- $\sum_{i=1}^{n} \alpha_i = 1$, --.

Column 9, Lines 64-65:

Delete the phrase "$R^2 = K(x_k, x_k) - 2\sum_{i=1}^{N_{SV}} \alpha_i K(x_i, x_k) + \sum_{i=1}^{N_{SV}} \sum_{j=1}^{N_{SV}} \alpha_i \alpha_j K(x_i, x_j)$,"
and replace with -- $R^2 = K(x_k, x_k) - 2\sum_{i=1}^{N_{SV}} \alpha_i K(x_i, x_k) + \sum_{i=1}^{N_{SV}} \sum_{j=1}^{N_{SV}} \alpha_i \alpha_j K(x_i, x_j)$ --.

Column 10, Lines 6-7:

Delete the phrase "$dist^2(z) = K(z, z) - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j)$," and replace with
-- $dist^2(z) = K(z, z) - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j)$. --.

Column 10, Line 9:

Delete the phrase "$\sum_{i=1}^{N_{SV}} \sum_{j=1}^{N_{SV}} \alpha_i \alpha_j K(x_i, x_j)$ is a constant" and replace with
-- $\sum_{i=1}^{N_{SV}} \sum_{j=1}^{N_{SV}} \alpha_i \alpha_j K(x_i, x_j)$ is a constant --.

Column 10, Lines 13-15:

Delete the phrase "equation (14) can be simplified to $R^2 = 1 - 2\sum_{i=1}^{N_{SV}} \alpha_i K(x_i, x_k) + G$ for a Gaussian kernel function. Equation (15) can be simplified to $dist^2(z) = 1 - 2\sum_{i=1}^{N_{SV}} \alpha_i K(x_i, z) + G$," and replace with --equation (14) can be simplified to $R^2 = 1 - 2\sum_{i=1}^{N_{SV}} \alpha_i K(x_i, x_k) + G$ for a Gaussian kernel function. Equation (15) can be simplified to $dist^2(z) = 1 - 2\sum_{i=1}^{N_{SV}} \alpha_i K(x_i, z) + G$ --.

Column 12, Lines 46-47:
Delete the phrase "{−0.14818008, 0.284623624,−0.252853808, 0.159059498, 0.001381145}." and replace with --{−0.14818008, 0.284623624,−0.252853808, 0.159059498, −0.001381145}.--.

Column 14, Lines 24-25:
Delete the phrase "$D_{md} = \text{median}_{i<j} \| x_i - x_j \|, i = 1, \ldots, N \text{ and } j = 1, \ldots, N.$" and replace with
--$D_{md} = \text{median}_{i<j} \| x_i - x_j \|, i = 1, \ldots, N \text{ and } j = 1, \ldots, N.$--.

Column 14, Lines 29-30:
Delete the phrase "Gaussian bandwidth parameters is computed" and replace with
--Gaussian bandwidth parameter $s$ is computed--.

Column 14, Line 41:
Delete the phrase "$i = 1, N. W = \sum_{i=1}^{N} w_i, M = \sum_{i=1}^{N} w_i$, ..., and" and replace with
--$i = 1, \ldots, N. W = \sum_{i=1}^{N} w_i, M = \sum_{i=1}^{N} w_i^2$, and--.

Column 14, Line 45:
Delete the phrase "a variance value $\sigma^{-2}$ is computed" and replace with --a variance value $\sigma^2$ is computed--.

Column 14, Line 47:
Delete the phrase "$\sigma^{-2} = \sum_{i=1}^{p} \sigma_i^2$, where each $\sigma^2$ is computed" and replace with
-- $\sigma^2 = \sum_{i=1}^{p} \sigma_i^2$ where each $\sigma_i^2$ is computed--.

Column 14, Line 65:
Delete the phrase "$F_W = W / \sqrt{Q \times \ln[(N-1)/\delta^2]}$." and replace with --$F_W = W / \sqrt{Q \times \ln[2Q/(\delta^2 M)]}$.--.

Column 18, Lines 59-60:
Delete the phrase "$dist^2(z) = K(z,z) - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j),$" and replace with
--$dist^2(z) = K(z,z) - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j),$--.

Column 19, Line 5:
Delete the phrase "$G = \sum_{i=1}^{N_{SV}} \sum_{j=1}^{N_{SV}} \alpha_i \alpha_j K(x_i, x_j)$" and replace with --$G = \sum_{i=1}^{N_{SV}} \sum_{j=1}^{N_{SV}} \alpha_i \alpha_j K(x_i, x_j)$--.

Column 19, Lines 12-13:
Delete the phrase "$dist^2(z) = 1 - 2\sum_{i=1}^{N_{SV}} \alpha_i K(x_i, z) + G.$" and replace with
--$dist^2(z) = 1 - 2\sum_{i=1}^{N_{SV}} \alpha_i K(x_i, z) + G.$--.

Column 21, Line 37:

Delete the phrase "position $a_m$, $R_m{}^2$," and replace with --position $a_m$, $R_m^2$,--.

Column 21, Lines 41-42:

Delete the phrase "$dist_n(z) = K(z,z) - 2\sum_{i=1}^{N_{SV}} \alpha_{im} K(x_i, z) + \sum_{i=1}^{N_{SV}} \sum_{j=1}^{N_{SV}} \alpha_{im}\alpha_{jm} K(x_i, x_j)$," and replace with --$dist_m^2(z) = K(z,z) - 2\sum_{i=1}^{N_{SV}} \alpha_{im} K(x_i, z) + \sum_{i=1}^{N_{SV}} \sum_{j=1}^{N_{SV}} \alpha_{im}\alpha_{jm} K(x_i, x_j)$,--.

Column 21, Lines 61-62:

Delete the phrase "$dist^2(z) = 1 - 2\sum_{i=1}^{N_{SV}} \alpha_{im} K(x_i, z) + G_m$." and replace with --$dist^2(z) = 1 - 2\sum_{i=1}^{N_{SV}} \alpha_{im} K(x_i, z) + G_m$.--.

Column 21, Line 64:

Delete the phrase "whether or not $dist^2(z) > R_m{}^2$. When $dist^2(z) \leq R_m{}^2$," and replace with --whether or not $dist^2(z) > R_m^2$. When $dist^2(z) \leq R_m^2$,--.

Column 21, Line 66:

Delete the phrase "When $dist^2(z) > R_m{}^2$," and replace with --When $dist^2(z) > R_m^2$,--.

Column 23, Line 32:
Delete the phrase "the mean pairwise distance D" and replace with --the mean pairwise distance $\bar{D}$--.

Column 23, Line 39:

Delete the phrase "$S = (\sum_{j=1}^{p} \sigma_j^2)^{0.5}$," and replace with --$S = (\sum_{j=1}^{p} \sigma_j^2)^{0.5}$,--.

Column 25, Line 15:
Delete the phrase "Computation of the Gaussian bandwidth parameters" and replace with --Computation of the Gaussian bandwidth parameter $s$--.

Column 25, Lines 18-19:
Delete the phrase "Computation of the Gaussian bandwidth parameters" and replace with --Computation of the Gaussian bandwidth parameter $s$--.

In the Claims

Claim 12, Column 29, Line 62:

Delete the phrase "$W = \sum_{i=1}^{N} w_i, M = \sum_{i=1}^{N} w_i^2$," and replace with --$W = \sum_{i=1}^{N} w_i, M = \sum_{i=1}^{N} w_i^2$,--.

Claim 13, Column 30, Line 3:

CERTIFICATE OF CORRECTION (continued)
U.S. Pat. No. 10,482,353 B2

Delete the phrase "$\sigma^2 = \sum_{i=1}^{p} \sigma_i^2,$" and replace with -- $\sigma^2 = \sum_{i=1}^{p} \sigma_i^2,$ --.

Claim 16, Column 30, Lines 30-31:
Delete the phrase "$\max(\sum_{i=1}^{N} \alpha_i K(x_i, x_i) - \sum_{i=1}^{N} \sum_{j=1}^{N} \alpha_i \alpha_j K(x_i, x_j))$, subject to $\sum_{i=1}^{N} \alpha_i = 1$," and replace with -- $\max(\sum_{i=1}^{N} \alpha_i K(x_i, x_i) - \sum_{i=1}^{N} \sum_{j=1}^{N} \alpha_i \alpha_j K(x_i, x_j))$, subject to $\sum_{i=1}^{N} \alpha_i = 1$ --.

Claim 19, Column 30, Lines 58-59:
Delete the phrase "$R^2 = 1 - 2\sum_{i=1}^{N_{SV}} \alpha_i K(x_i, x_k) + \sum_{i=1}^{N_{SV}} \sum_{j=1}^{N_{SV}} \alpha_i \alpha_j K(x_i, x_j),$" and replace with -- $R^2 = 1 - 2\sum_{i=1}^{N_{SV}} \alpha_i K(x_i, x_k) + \sum_{i=1}^{N_{SV}} \sum_{j=1}^{N_{SV}} \alpha_i \alpha_j K(x_i, x_j),$ --.

Claim 21, Column 31, Line 13:
Delete the phrase "$dist^2 = 1 - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j),$" and replace with -- $dist^2 = 1 - 2\sum_{i=1}^{N_{SV}} \alpha_i K(x_i, z) + \sum_{i=1}^{N_{SV}} \sum_{j=1}^{N_{SV}} \alpha_i \alpha_j K(x_i, x_j),$ --.

Claim 27, Column 32, Lines 7-8:
Delete the phrase "$dist_m^2(z) = 1 - 2\sum_{i=1}^{N_{SV}} \alpha_{im} K(x_i, z) + \sum_{i=1}^{N_{SV}} \sum_{j=1}^{N_{SV}} \alpha_{im} \alpha_{jm} K(x_i, x_j),$" and replace with -- $dist_m^2(z) = 1 - 2\sum_{i=1}^{N_{SV}} \alpha_{im} K(x_i, z) + \sum_{i=1}^{N_{SV}} \sum_{j=1}^{N_{SV}} \alpha_{im} \alpha_{jm} K(x_i, x_j),$ --.